United States Patent [19]

Shibata et al.

[11] Patent Number: 5,364,302
[45] Date of Patent: Nov. 15, 1994

[54] APPARATUS FOR MANUFACTURING HAMS OR THE LIKE

[75] Inventors: Chiyoji Shibata, Yokohama; Minoru Nakamura, Tokyo, both of Japan

[73] Assignee: Hitec Co., Ltd., Tokyo, Japan

[21] Appl. No.: 962,575

[22] PCT Filed: May 11, 1992

[86] PCT No.: PCT/JP92/00597
§ 371 Date: Dec. 30, 1992
§ 102(e) Date: Dec. 30, 1992

[87] PCT Pub. No.: WO92/20242
PCT Pub. Date: Nov. 26, 1992

[30] Foreign Application Priority Data
May 13, 1991 [JP] Japan ............... 3-138173

[51] Int. Cl.⁵ ........................................ A22C 7/00
[52] U.S. Cl. ........................... 452/174; 452/42; 425/513
[58] Field of Search ............... 452/174, 35, 37, 42; 426/513, 105; 99/441; 156/188, 166; 425/347

[56] References Cited

U.S. PATENT DOCUMENTS

| | | |
|---|---|---|
| 3,283,361 | 11/1966 | Sommer ................ 452/42 |
| 3,913,175 | 10/1975 | Peterson ............... 426/513 |
| 4,356,595 | 11/1982 | Sandberg et al. ...... 426/513 |
| 4,651,498 | 3/1987 | Piereder ............... 452/42 |
| 4,771,510 | 9/1988 | Kawai ................. 452/35 |
| 5,116,450 | 5/1992 | Spoo et al. ........... 456/180 |
| 5,127,980 | 7/1992 | Cavin ................. 425/347 |
| 5,145,454 | 9/1992 | Sandberg et al. ...... 452/174 |
| 5,246,721 | 9/1993 | Kerkonian ............. 426/513 |

FOREIGN PATENT DOCUMENTS

| | | |
|---|---|---|
| 55-23346 | 6/1980 | Japan . |
| 56-164737 | 12/1981 | Japan . |
| 57-68735 | 4/1982 | Japan . |
| 59-166032 | 9/1984 | Japan . |
| 60-36250 | 8/1985 | Japan . |
| 1-38455 | 8/1989 | Japan . |

Primary Examiner—Willis Little
Attorney, Agent, or Firm—Nixon & Vanderhye

[57] ABSTRACT

To enhance safety in cases where an upper die is fitted to a lower die into which a meat mass is fed, a state in which the upper die is fitted to the lower die is made basic. A measure is provided to ensure that a safety cover does not open in a state in which the upper die is raised, and the meat mass is automatically fed to the lower die as the upper die is raised, thereby enhancing the operating efficiency.

18 Claims, 35 Drawing Sheets

FIG. 8
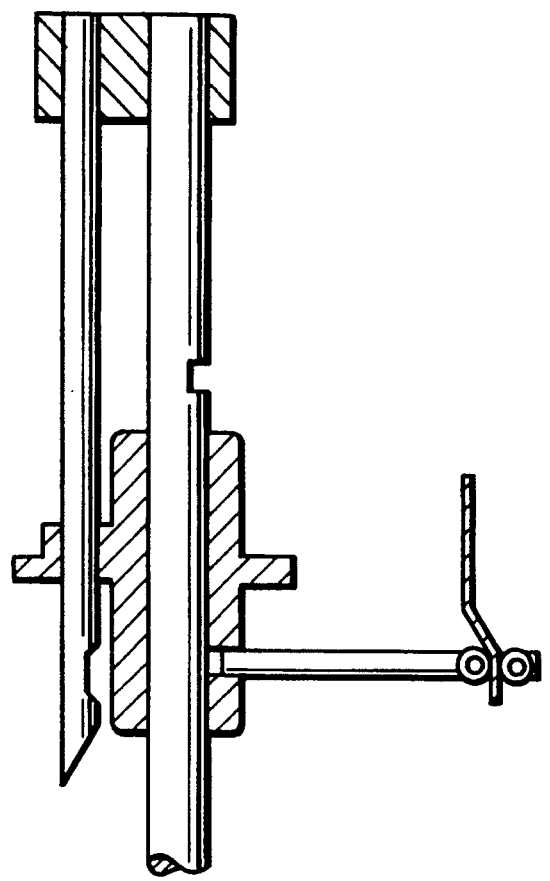
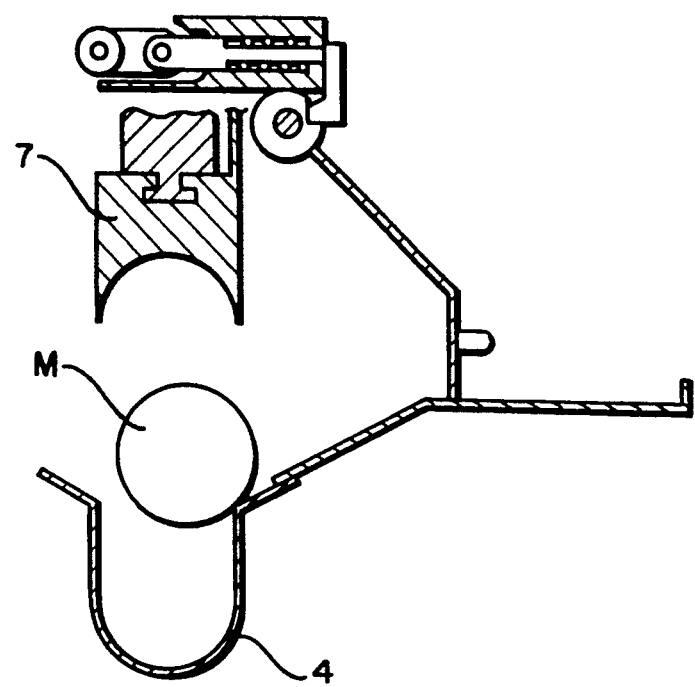

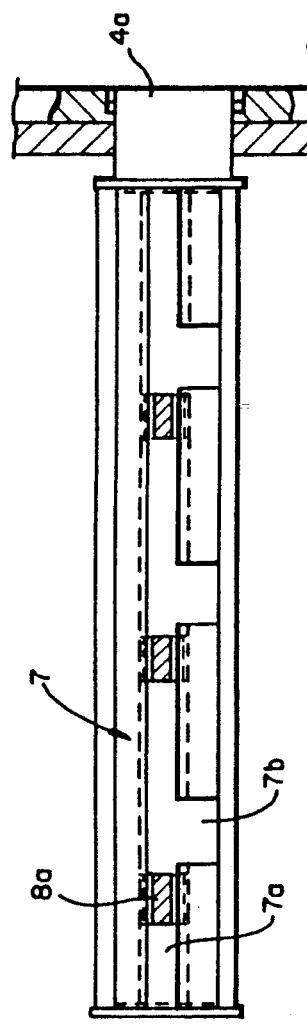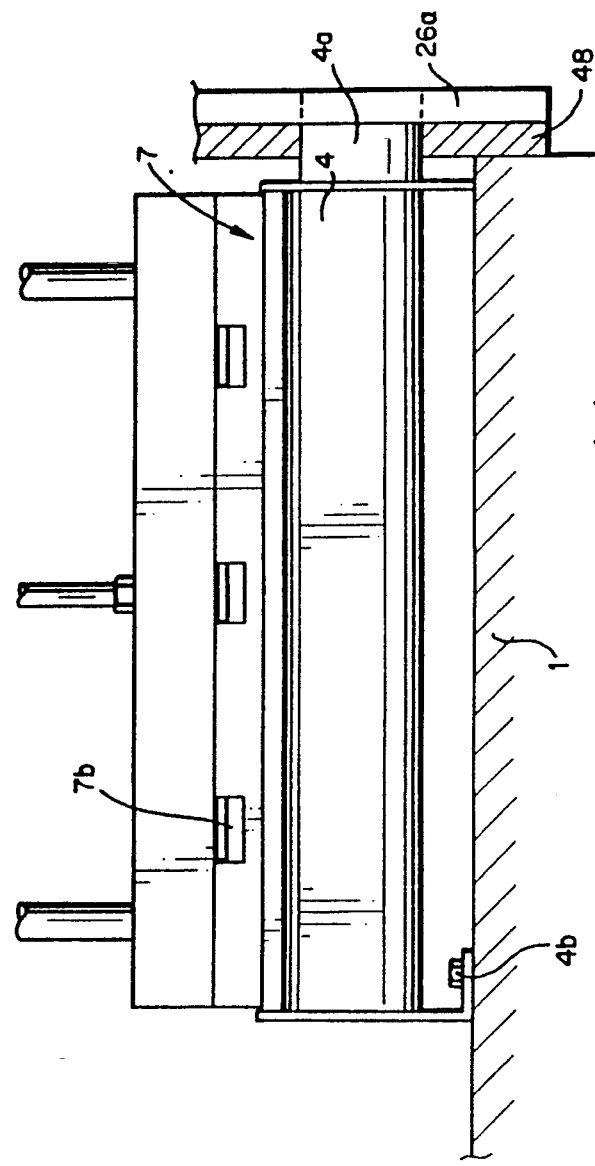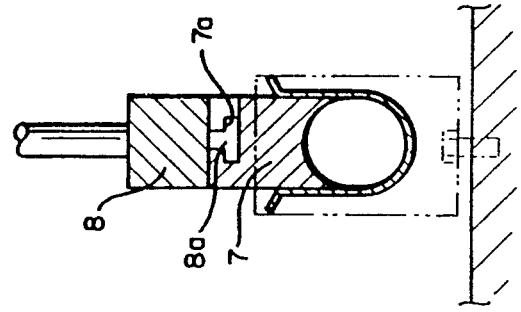

FIG. 22
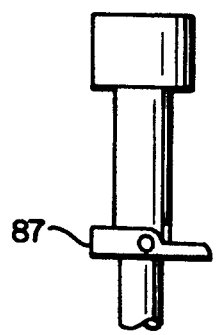
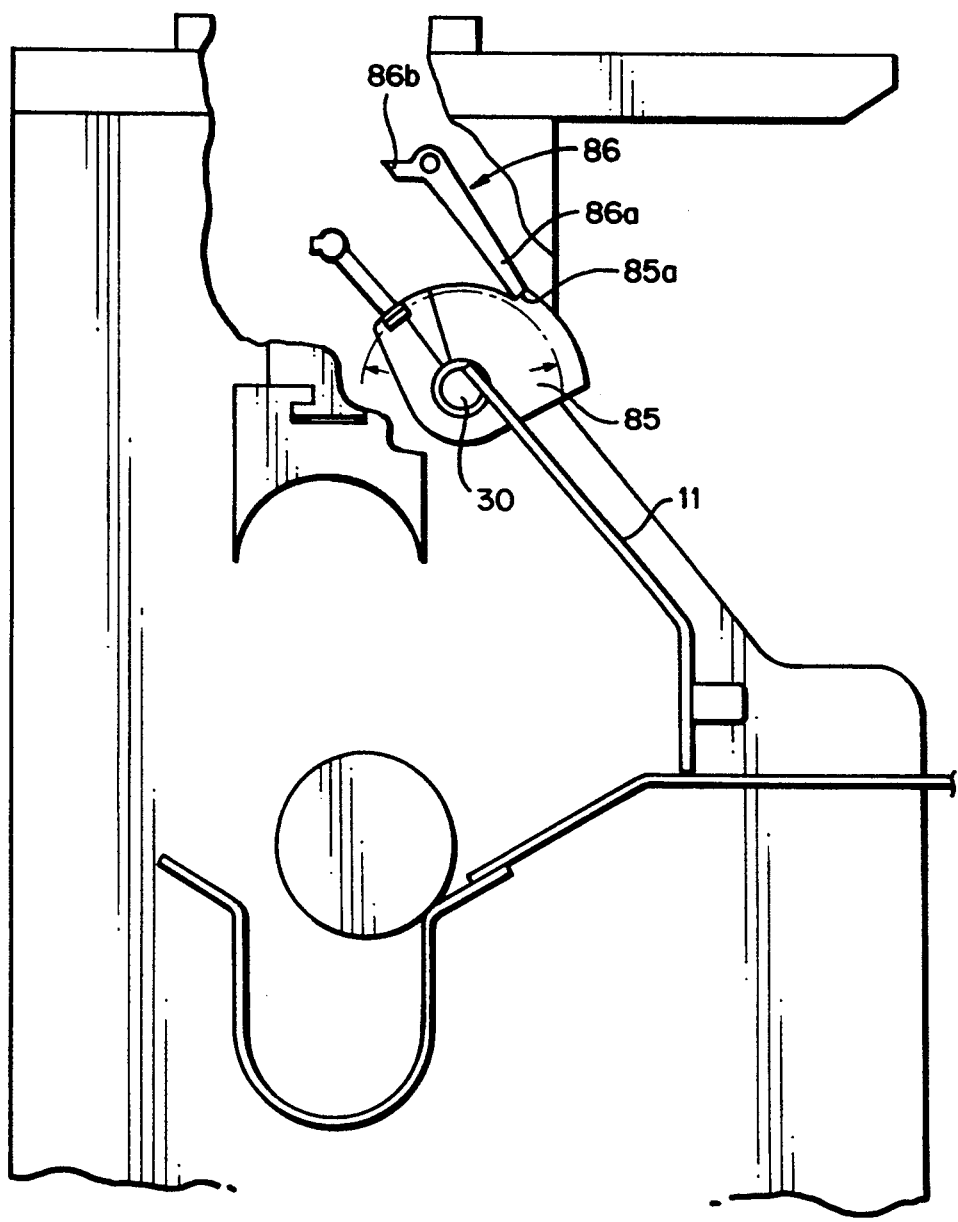

FIG. 29
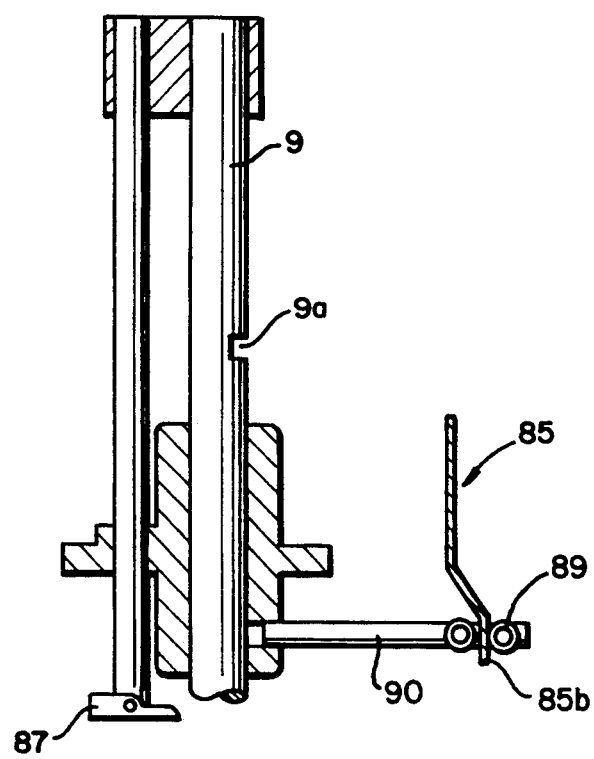
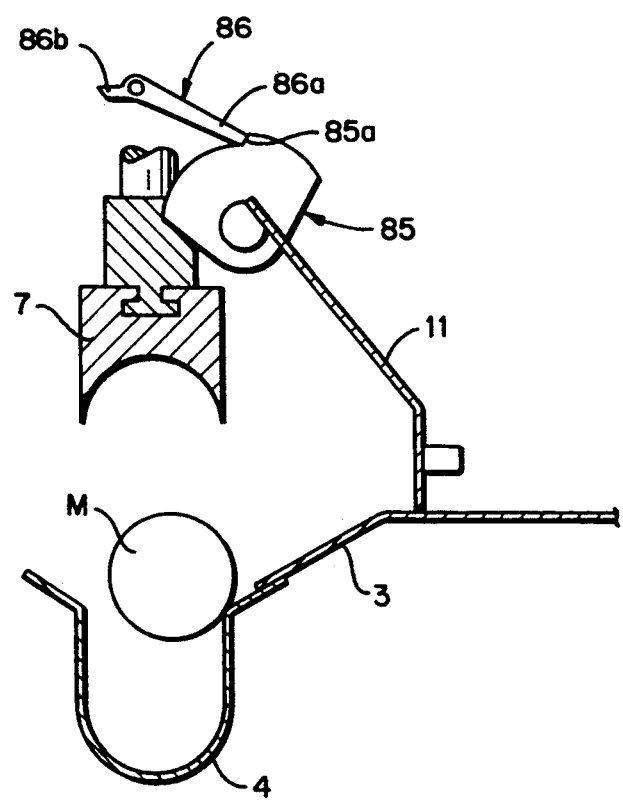

What is claimed is:

APPARATUS FOR MANUFACTURING HAMS OR THE LIKE

TECHNICAL FIELD

The present invention relates to improvements in a manufacturing apparatus in which, at the time of manufacturing hams, sausages or the like, the processes of metering the weight of a raw material of the hams, sausages or the like to an arbitrarily selected amount and of taking out the metered raw material of the hams, sausages or the like are mechanized, thereby stabilizing the product quality to a fixed level and speeding up the operation.

BACKGROUND ART

The applicant has already developed an apparatus for mechanically manufacturing hams or the like, has obtained a patent therefor, and has marketed this product (refer to Japanese Patent Application Laid-Open No. 164737/1981).

This publicly known apparatus for manufacturing hams or the like is arranged as follows.

Referring to FIGS. 31 and 32, reference numeral 101 denotes a hopper, in which an upper die 102 and a lower die 103 are arranged in a two-split configuration. Its inner peripheral surface is formed in a cylindrical shape, and a meat mass is filled therein. It should be noted that if the shape of the ham or the like is angular such as quadrangular, it is possible to arrange the inner peripheral surface in an angular configuration. The upper die 102 is secured to hinges 104, and as the hinges 104 are rotated about a shaft 105, the upper die 102 is placed on the lower die 103. This operation is effected as rods 106 are vertically moved by means of an unillustrated cylinder and the like via links 107.

Reference numeral 108 denotes a cylinder, and a force pusher 109 is disposed on a tip of a rod thereof. The force pusher 109 is disposed at one end of the hopper 101 in face-to-face relation therewith, and is adapted to force the meat mass filled in the hopper 101 into a meat metering port which will be described later.

Reference numeral 110 denotes a rotating displacement body, which is disposed at the other end side of the hopper 101 and rotates in a forward direction about a shaft 111 in this embodiment.

The displacement body 110 has end plates 112 respectively disposed at opposite ends thereof, and four sleeves 113 are clamped therebetween. An inner port of each sleeve 113 is formed as a meat metering port into which the meat mass is filled, and circular ports are provided in the respective end plates 112 in conformity with the meat metering ports.

Reference numeral 114 denotes a variable metering device, in which the position of a stopper 115, which is inserted into the metering port in the aforementioned sleeve 113, is changed by a handle 116.

Reference numeral 117 denotes an extruding cylinder, which is adapted to extrude the meat mass filled in the metering port in the sleeve 113 to the outside by reciprocating a pusher 128 (see FIG. 36 to which reference will be made later) disposed at a tip of a rod 118 thereof. A discharge nozzle 119 allows an unillustrated casing to be put over the meat mass when the meat mass extruded by the extruding pusher 128 is discharged, so that the meat mass is stuffed into the casing by a manual operation to make a ham or the like.

Referring to FIG. 33, the lower die 103 is affixed to a bed 120, and as the upper die 102 is inserted into the lower die 103, an inner peripheral surface is formed in their interiors.

The upper die 102 is affixed to the hinges 104 via a mounting plate 121, the hinges 104 being rotatably secured to the shaft 105. The rods 106 project from below the bed 120, and are affixed to the hinges 104 via the links 107, respectively. The hinges 104 and the rods 106 are disposed in two pairs on the upper die 102, and the opening and closing thereof are simultaneously controlled via a cylinder 123 and an arm 124 both shown in FIG. 34.

Referring to FIG. 34, the cylinder 108 is affixed on the bed 120, and the force pusher 109 reciprocates in a circumferential inner port 125 of the hopper 101.

The displacement body 110 holds the four sleeves 113 between the circular end plates 112. One of the sleeves 113 is disposed in face-to-face relation with the inner port 125 of the hopper 101, and its inner-side circular port is formed as a meat metering port 126.

The stopper 115 is inserted into one end of the meat metering port 126 to set the axial length of the meat metering port 126. The stopper 115 has its amount of elongation controlled by the variable metering device which will be described later.

A description will now be given of the variable metering device with reference to the parts (a), (b) and (c) of FIG. 35.

A plate member 139 which will be described later is put on the end plate 112 of the displacement body, and two holding rods 127 project from the plate member 139 and have their other ends secured by a vibration-suppressing plate 128. The holding rods 127 are partially threaded, and sprockets 129, 130 having internal threads are fitted thereon, respectively. A stopper plate 131 is rotatably secured to the sprockets 129, 130, respectively, and a cylinder 132 is secured to the stopper plate 131. The handle 116 is axially mounted on the stopper plate 131, and a sprocket 133 is disposed on the handle 116. As shown in the part (b), the handle 116 is located at a position offset in one direction from the sprockets 129, 130 through which the holding rods 127 are inserted, and a chain 134 is wound around the sprockets 129, 130, 133.

The stopper 115 reciprocatably project from the cylinder 132, and is inserted into the meat metering port, as described above.

A regulator plate 135 is fixed to the holding rods 127 at a position close to the meat metering port. As shown in the part (c), the regulator plate 135 has holes 136 for fitting with the holding rods 127, as well as set screw holes 137 respectively communicating with the holes 136.

Referring to FIG. 36, the cylinder 117 is provided with the extruding pusher 128, which opposes the sleeve 113 of the displacement body 110. The extruding pusher 128 is inserted into the meat metering port in the sleeve 113.

In addition, the disk-like plate member 139 is disposed on the outer side of the end plate 112 of the displacement body 110 in such a manner as to be rotatable about a hinge 140.

The other side of the plate member 139 is fixed by means of a screw 141.

Referring to the parts (a) and (b) of FIG. 37, a joint plate 141 is disposed at a joint between the end plate 112 of the displacement body and the hopper 101.

The joint plate 141 is provided with a hole 142 which matches with the meat metering port 126, and a groove 143 is cut in a vertical direction including the hole 142. An arm 146 extending from a rod 145 of a cylinder 144 disposed underneath the bed 120 is coupled to a rod 148 for holding a cutter 147, and the cutter 147 slides in the aforementioned groove 143.

The operation of the publicly known apparatus for manufacturing hams or the like having the above-described arrangement will be described below.

Referring to FIGS. 31 to 37, the meat mass is first filled into the inner port 125 in the lower die 103 in a state in which the upper die 102 of the hopper 101 is open. Then, as the cylinder 123 is actuated, the upper die 102 is fitted in the lower die 103 via the arm 124, the rods 106, the links 107, and the hinges 104. By virtue of this operation, the meat mass which has been filled into the inner port 125 is pressed with a strong pressure.

Next, the cylinder 108 is actuated, which in turn causes the force pusher 109 to be forced under pressure into the inner port 125 in the hopper 101. The meat mass in the inner port 125 is then pressure-fed to the meat metering port 126 in the sleeve 113 disposed in the displacement body 110. At this time, since the stopper 115 of the variable metering device 114 is positioned in place, the volume of the meat mass pressure-fed to the meat metering port 126 is fixed.

Then, the operation of cutting the meat mass at a joint between the displacement body 110 and the hopper 101 sets in. In this operation, the cylinder 144 is actuated, which in turn causes the rod 145, the arm 146, and the rod 148 to move upwardly, thereby upwardly moving the cutter 147 in the groove 143 to effect cutting.

Upon completion of this cutting operation, the displacement body 110 rotates 90°. When this rotating operation is effected, if pressure remains within the hopper 101, the cutter 147 presses the displacement body 110 and thereby applies a brake thereto, so that the pressure applied to the force pusher 109 is released.

A description will now be given of the operation of extruding the meat mass filled in the meat metering port 126.

When the meat mass forced into the meat metering port 126 from the hopper 101 is rotated 180° after being cut the meat mass is opposed to the position of the extruding cylinder 117. Then, when the cylinder 117 is actuated, the extruding pusher 128 is inserted into the meat metering port 126, and the filled meat mass is taken out from the discharge nozzle 119. In this case, if the filled meat mass is taken out after putting the casing on the discharge nozzle 119, the stuffing of the meat mass into the casing is effected, but a separately installed encasing apparatus may be used to effect stuffing.

A description will now be given of the operation of the variable metering device.

Referring mainly to FIG. 35, if the handle 116 is rotated, the sprocket 133 is rotated. Then, the chain 134 wound around the sprocket 133 causes the sprockets 129, 130 to rotate. Since the sprockets 129, 130 are screwed to the holding rods 127, respectively, as they rotate, the stopper plate 131 secured to the respective sprockets 129, 130 is displaced by a predetermined amount. Since the cylinder 132 is secured to the stopper plate 131, the cylinder 132 is also displaced integrally.

As for the set position of the stopper 115, the position in which the cylinder 132 is elongated most is set as a standard. Accordingly, after the cylinder 132 is actuated and the stopper 115 is elongated completely, the aforementioned force pusher 109 is actuated to fill the meat into the meat metering port 126.

However, if the stopper 115 remains inserted in the meat metering port 126, when the displacement body 110 rotates, it is necessary to pull the stopper 115 in advance out of the meat metering port 126. Therefore, upon completion of the meat filling operation, the cylinder 132 is actuated to pull the stopper 115 out of the meat metering port 126. In this case, if the stopper 115 is pulled too far from the end face of the meat metering port 126, there is the risk of the meat mass in the meat metering port 126 being spilt to the outside due to residual pressure and the like. Accordingly, the regulator plate 135 is provided to set the return position of the stopper 115 to allow the stopper 115 to serve as a closing cover as well.

Referring mainly to FIG. 36, a description will now be given of the operation of cleaning the displacement body.

The variable metering device 114 and the discharge nozzle 119 are respectively affixed to the plate member 139. Therefore, if the screw 141 is removed, and if the plate member 139 is rotated with the hinge 140 as an axis, the variable metering device 114 and the nozzle 119 are opened integrally.

Then, if the displacement body 110 is removed, the displacement body 110 can be removed integrally with the end plate 112. As a result, the displacement body 110 can be cleaned, and the operations of cleaning and replacing the cutter 147 can also be effected.

With the above-described apparatus for manufacturing hams or the like, however, there have been the following problems.

First, in the conventional manufacturing apparatus, the upper die waits at an upper dead center, and the operator supplies the meat mass into the lower die in the meantime, so that there is a drawback in speeding up in the manufacturing process by that portion. In addition, cases were conceivable in which the upper die is unexpectedly lowered by a misoperation of the apparatus by a third person while the meat mass is being supplied.

In addition, since the apparatus is not so structured as to allow the meat juice and meat pieces, which are scattered in the apparatus during production, to be concentrated in one location, the meat juice and meat pieces adhere to various portions of the apparatus, thereby making cleaning difficult.

In addition, although, in foodstuff machines, it is necessary to clean the overall apparatus after completion of the operation so as to be ready for an ensuing operation, with the above-described conventional apparatus, the operations of mounting and demounting the upper die, the lower die, the displacement body, and the pushers are not simple, so that time and trouble have been required in the cleaning operation.

In addition, since the rod of the pusher disposed in the means for forcing in the meat mass is stained by the meat pieces and meat juice, and this rod is drawn as it is into the interior of the cylinder, thereby constituting a cause of malfunctioning.

In addition, since the groove where the cutter is disposed communicates with the outside, when the meat mass is cut by the cutter, there is the possibility of the meat pieces and meat juice leaking through the groove, thereby deteriorating the quantitative accuracy or the yield. Furthermore, there has been the risk of deteriorating the working environment.

In addition, when the meat mass is forced into the metering port and is successively cut by the cutter, if the last meat mass has an insufficient length and needs to be taken out separately, with the conventional apparatus, this residual meat mass is either taken out from the lower die by the operator, or taken out from the discharge nozzle after it is temporarily filled in the metering port. Therefore, there has been a drawback in the operating efficiency in that the operation is suspended in the meantime.

In addition, the displacement body has a central axis and is so constructed as to be rotated by means of the central axis, so that the outside diameter becomes large by the portion in which the central axis is provided, thereby causing a hindrance to the rendering of the apparatus compact.

In addition, with the above-described conventional apparatus, it has been impossible for the meat mass fed between the upper die and to the lower die to be extruded as it is and to be sealed into the casing.

Accordingly, an object of the present invention is to provide an apparatus for manufacturing hams or the like which overcomes the drawbacks of the above-described conventional manufacturing apparatus, has high safety, is easy to handle, is hygienic, and has improved operating efficiency.

DISCLOSURE OF INVENTION

The characteristic features of the present invention are disclosed in its claims which reside in the following:

An apparatus for manufacturing hams or the like, comprising a displacement body having a metering port into which a meat mass is filled, a placing table for placing the meat mass thereon, a lower die into which a meat mass on the placing table is dropped, an upper die which is fitted to the lower die, means for forcing the meat mass formed by the upper die and the lower die into a metering port in the displacement body, means for displacing the displacement body from a predetermined position to another position, and means for extruding the meat mass in the metering port in the displacement body displaced, wherein the apparatus is provided with an openable safety cover for covering the placing table and the lower die, the placing table forming an inclined surface between the safety cover and the lower die, the upper die fitted to the lower die having a stopper portion for preventing the downward movement of the meat mass arranged in advance on the inclined surface, and the upper die being moved upward with the safety cover closed, thereby to automatically feed the meat mass to an interior of the lower die.

An apparatus for manufacturing hams or the like, comprising a displacement body having a metering port into which a meat mass is filled, a placing table for placing the meat mass thereon, a lower die into which the meat mass on the placing table is dropped, an upper die which is fitted to the lower die, means for forcing the meat mass formed by the upper die and the lower die into the metering port in the displacement body, means for displacing the displacement body from a predetermined position to another position, and means for extruding the meat mass in the metering port in the displacement body displaced, wherein the apparatus is provided with an openable safety cover for covering the placing table and the lower die, and a pushing member rotatably disposed on an inner side of the safety cover, the pushing member being rotated by the upward movement of the upper die when the upper die is moved upward with the safety cover closed, thereby to feed the meat mass to an interior of the lower die.

An apparatus for manufacturing hams or the like, comprising a displacement body having a metering port into which a meat mass is filled, a placing table for placing the meat mass thereon, a lower die into which the meat mass on the placing table is dropped, an upper die which is fitted to the lower die, means for forcing the meat mass formed by the upper die and the lower die into the metering port in the displacement body, means for displacing the displacement body from a predetermined position to another position, and means for extruding the meat mass in the metering port in the displacement body displaced, wherein the apparatus is provided with an openable safety cover for covering the placing table and the lower die, first lock means for preventing an opening operation of the safety cover, second lock means for preventing an upward movement of the upper die, first controlling means for effecting control such that the second lock means is engaged when the safety cover undergoes the opening operation, and the second lock means is disengaged when the safety cover undergoes a closing operation, and second controlling means for effecting control such that the first lock means is disengaged at a position in which the upper die is fitted to the lower die, the engagement of the first lock means being effected by the closing operation of the safety cover, the safety cover becoming openable with the upper die fitted to the lower die, and the opening operation of the safety cover being not allowed in a state in which the upper die is undergoing the upward movement and a downward movement.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, means for extruding the meat mass in the metering port in the displacement body displaced, and a cutter disposed between the lower die and the metering port, the cutter being disposed vertically movably through a guide groove formed in an interior of two cases disposed with the cutter placed therebetween in a mutually sealed state.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, means for extruding the meat mass in the metering port in the displacement body displaced, and a cutter disposed between the lower die and the metering port, wherein the cutter is disposed vertically movably through a guide groove formed in an interior of two cases disposed with the cutter placed therebetween in a mutually sealed state, seal rings being provided between one of the two cases and a coupling cylindrical member disposed at an end of the lower die and between the other one thereof and the displacement body, respectively.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, and means for extruding the meat mass in the metering port in the displacement body displaced, wherein a liquid collecting plate is disposed in an inclined manner underneath the lower die.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, and means for extruding the meat mass in the metering port in the displacement body displaced, wherein the upper die, the lower die, pushers disposed at distal ends of the forcing means and the extruding means, and the metering port disposed in the displacement body are respectively disposed detachably.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, and means for extruding the meat mass in the metering port in the displacement body displaced, wherein the means for forcing the meat mass into the metering port is constituted by a pusher which is reciprocated by a cylinder, and a rod of the pusher is disposed by penetrating a tank in which a high-temperature liquid is stored.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, and means for extruding through a discharge nozzle the meat mass in the metering port in the displacement body displaced, wherein a changeover member constituted by a communicating pipe for introducing the meat mass in the metering port into the discharge nozzle and a discharge pipe for discharging the meat mass to a place other than the discharge nozzle is provided movably between the metering port positioned at a meat mass extruding position and the discharge nozzle.

An apparatus for manufacturing hams or the like, comprising a displacement body having a metering port into which a meat mass is filled, a lower die into which the meat mass is fed, an upper die which is fitted to the lower die, means for forcing the meat mass formed by the upper die and the lower die into the metering port in the displacement body, means for displacing the displacement body from a predetermined position to another position, and means for extruding the meat mass in the metering port in the displacement body displaced, wherein a frame member is provided on an outer side of an outer periphery of the displacement body, and a bearing is provided between the frame member and the displacement body, the displacement body being axially supported rotatably on the frame member.

An apparatus for manufacturing hams or the like, comprising a placing table for placing a meat mass thereon, a lower die into which the meat mass on the placing table is dropped, an upper die which is fitted to the lower die, and means for extruding the meat mass formed by the upper die and the lower die, wherein the apparatus is provided with an openable safety cover for covering the placing table and the lower die, the placing table forming an inclined surface between the safety cover and the lower die, the upper die fitted to the lower die having a stopper portion for preventing the downward movement of the meat mass arranged in advance on the inclined surface, a discharge nozzle being provided at an end of the lower die, and the upper die being moved upward with the safety cover closed, thereby to automatically feed the meat mass to an interior of the lower die.

An apparatus for manufacturing hams or the like, comprising a placing table for placing a meat mass thereon, a lower die into which the meat mass on the placing table is dropped, an upper die which is fitted to the lower die, and means for extruding the meat mass formed by the upper die and the lower die, wherein the apparatus is provided with an openable safety cover for covering the placing table and the lower die, a pushing member is rotatably disposed on an inner side of the safety cover, the pushing member is rotated by the upward movement of the upper die when the upper die is moved upward with the safety cover closed, thereby to feed the meat mass to an interior of the lower die, and a discharge nozzle is provided at an end of the lower die.

An apparatus for manufacturing hams or the like, comprising a placing table for placing a meat mass thereon, a lower die into which the meat mass on the placing table is dropped, an upper die which is fitted to the lower die, and means for extruding the meat mass formed by the upper die and the lower die, wherein the apparatus is provided with an openable safety cover for covering the placing table and the lower die, first lock means for preventing an opening operation of the safety cover, second lock means for preventing an upward movement of the upper die, first controlling means for effecting control such that the second lock means is engaged when the safety cover undergoes the opening operation, and the second lock means is disengaged when the safety cover undergoes a closing operation, second controlling means for effecting control such that the first lock means is disengaged at a position in which the upper die is fitted to the lower die, and a discharge nozzle at an end of the lower die, the engagement of the first lock means being effected by the closing operation of the safety cover, the safety cover becoming openable with the upper die fitted to the lower die, and the opening operation of the safety cover being not allowed in a state in which the upper die is undergoing the upward movement and a downward movement.

An apparatus for manufacturing hams or the like according to any one of claims 1 to 9, wherein there is provided stopper means which stops after entering up to a predetermined position in the metering port, and moves to outside the metering port when the displacement body is displaced after the meat mass is forced into the metering port.

An apparatus for manufacturing hams or the like, comprising a placing table for placing a meat mass thereon, a lower die into which the meat mass on the placing table is dropped, an upper die which is fitted to the lower die, and means for extruding the meat mass formed by the upper die and the lower die, wherein a guide groove having notched ports is provided in the upper die, guides provided on parts on a holder are fitted in the guide groove, the lower die is affixed to a base by means of a tightening member, and the upper die and the lower die are demounted or mounted as a unit by loosening the tightening member.

Hereafter, a more detailed description of the present invention will be given on the basis of specific examples shown in the drawings. Hence, the above-described invention and advantages, as well as other aspects of the invention and advantages, will become apparent. It should be noted that the present invention is not restricted to these specific examples.

BRIEF DESCRIPTION OF DRAWINGS

FIGS. 6, 7, 8 and 9 are diagrams illustrating the operation of the safety cover and the automatic feeding of a meat mass in accordance with the present invention;

Figure 14:
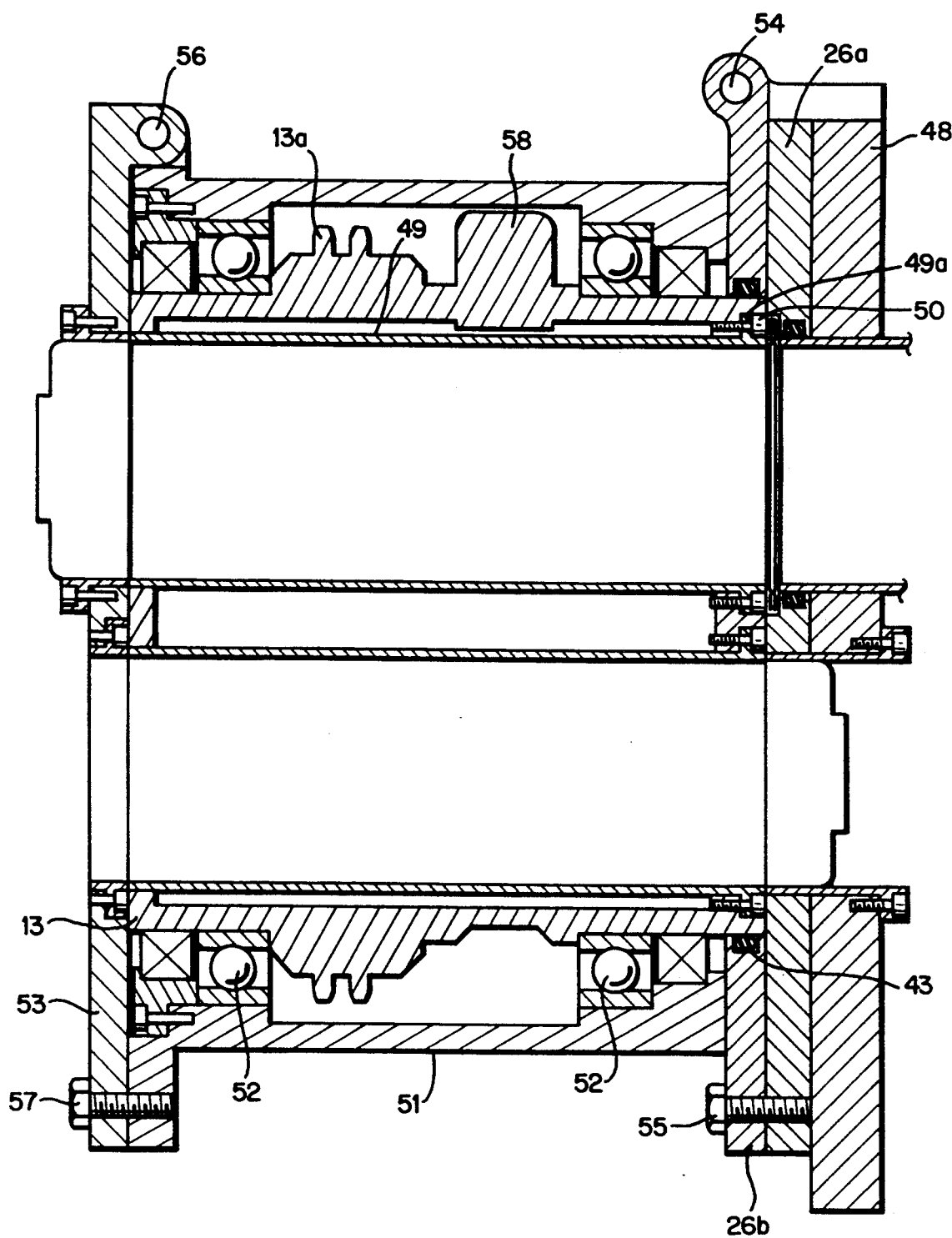
Figure 15:
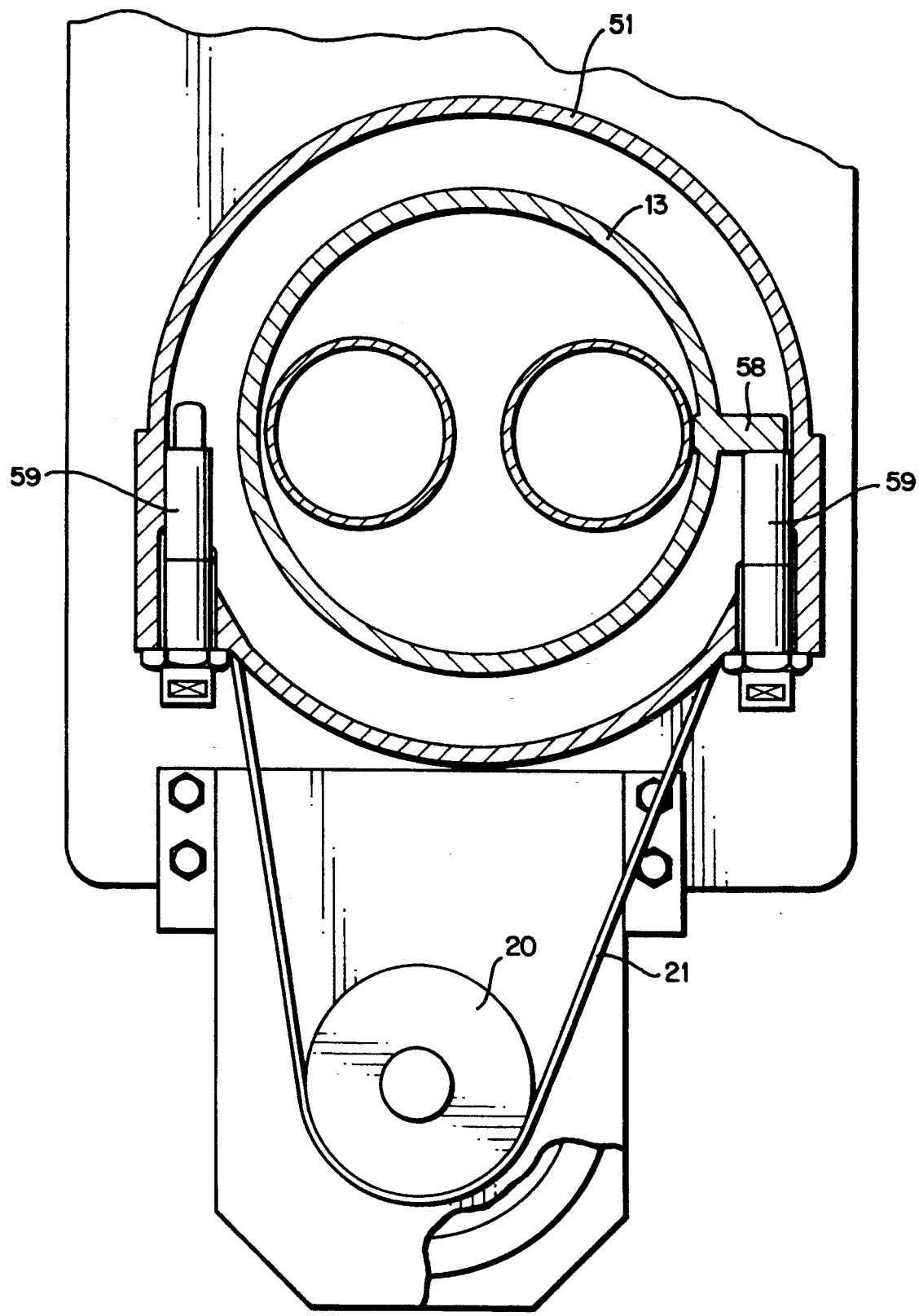
Figure 16C:
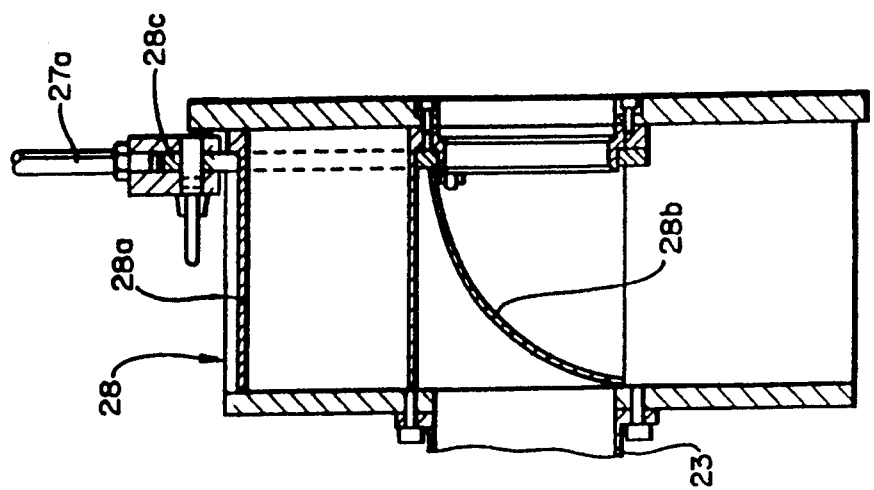
Figure 16B:
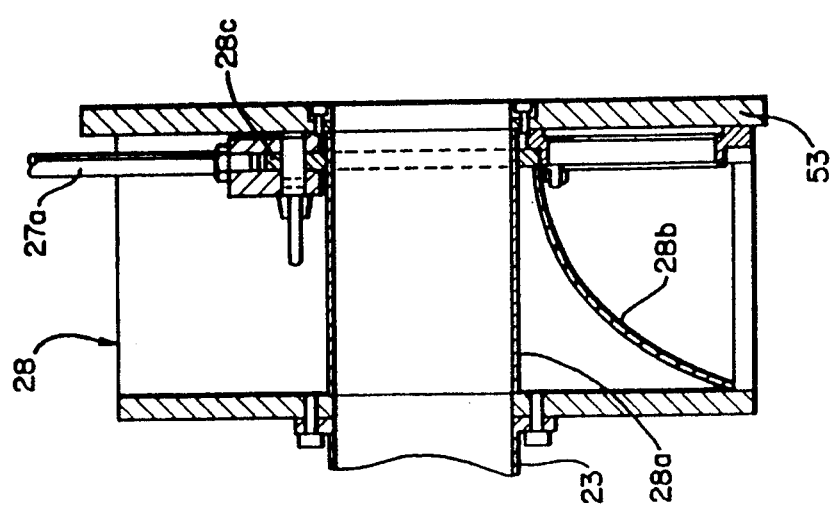
Figure 16A:
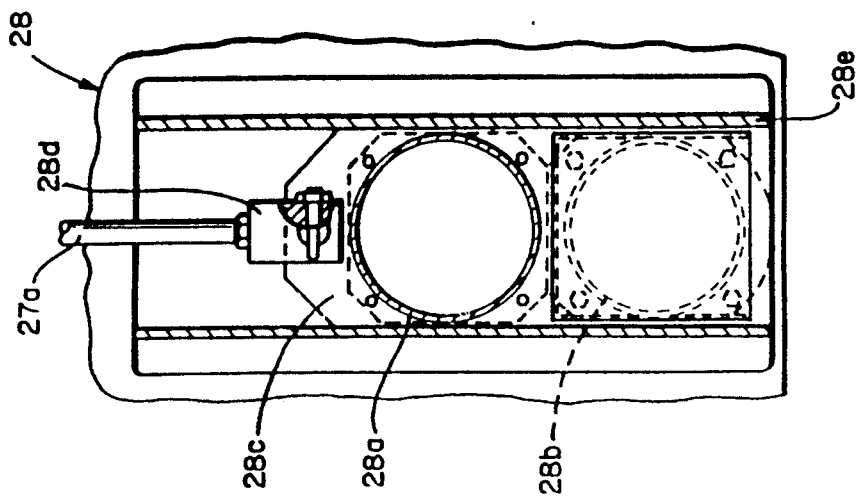
Figure 17:
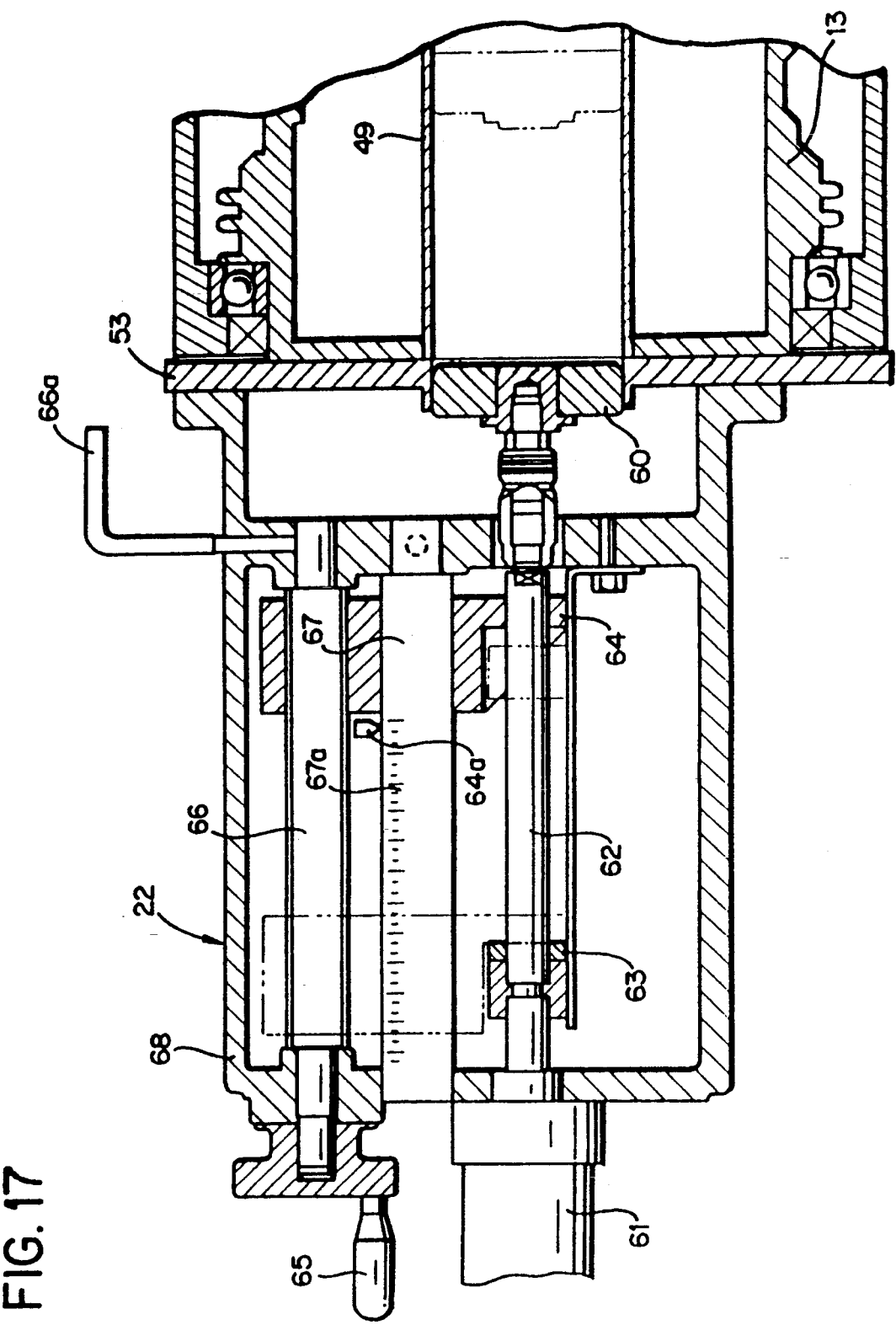
Figure 18:
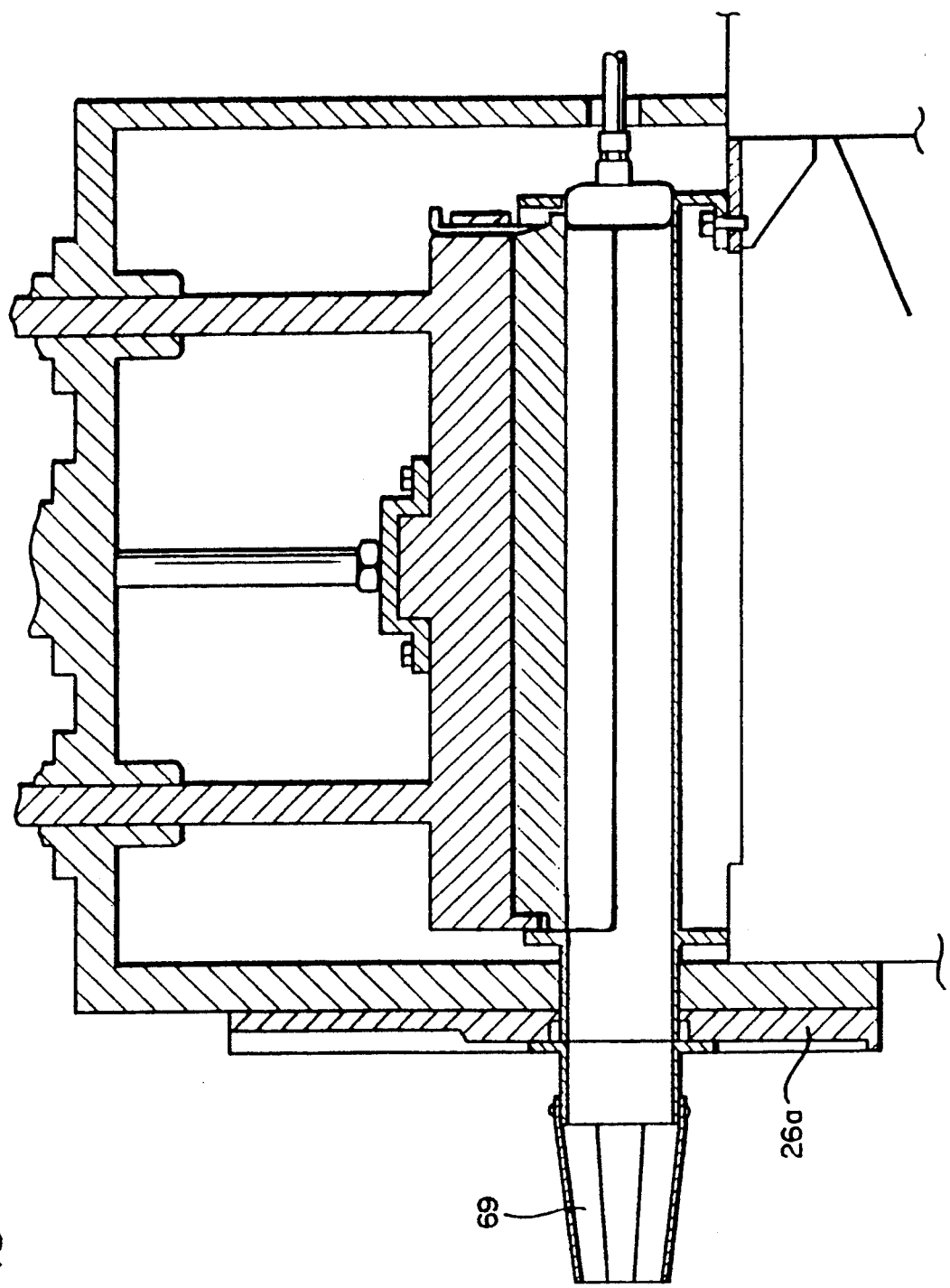
Figure 19B:
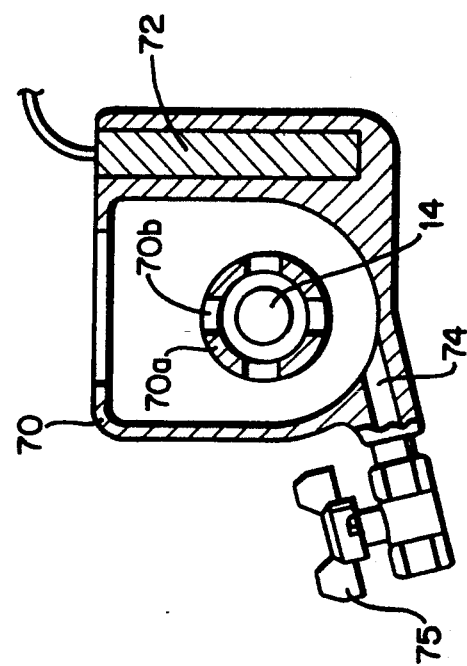
Figure 19A:
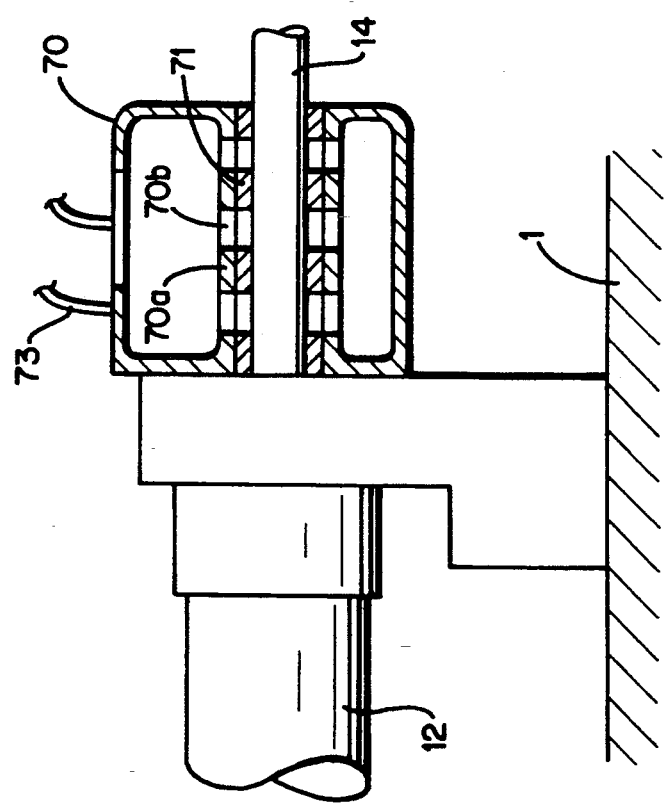
Figure 20:
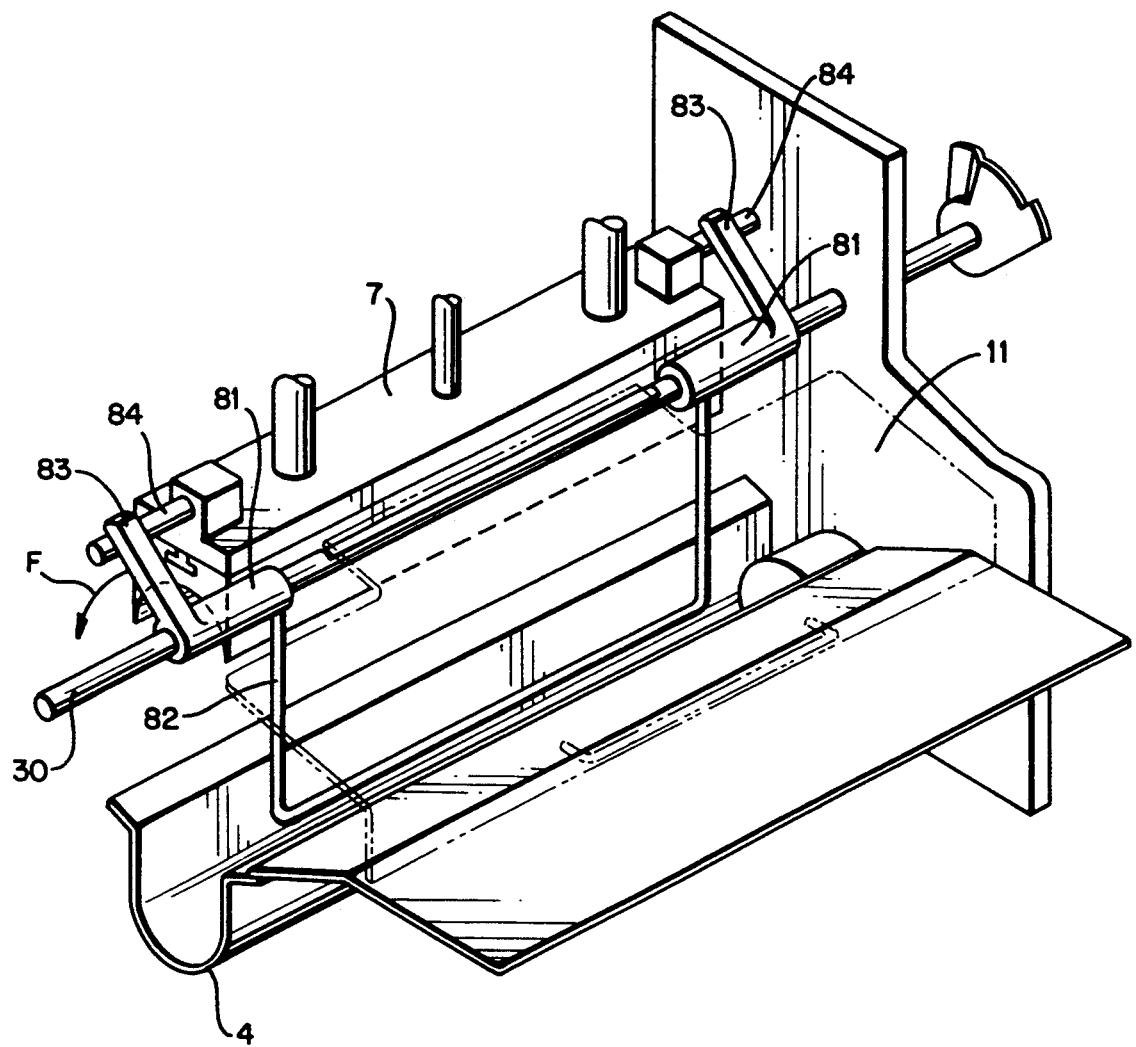
Figure 21A:
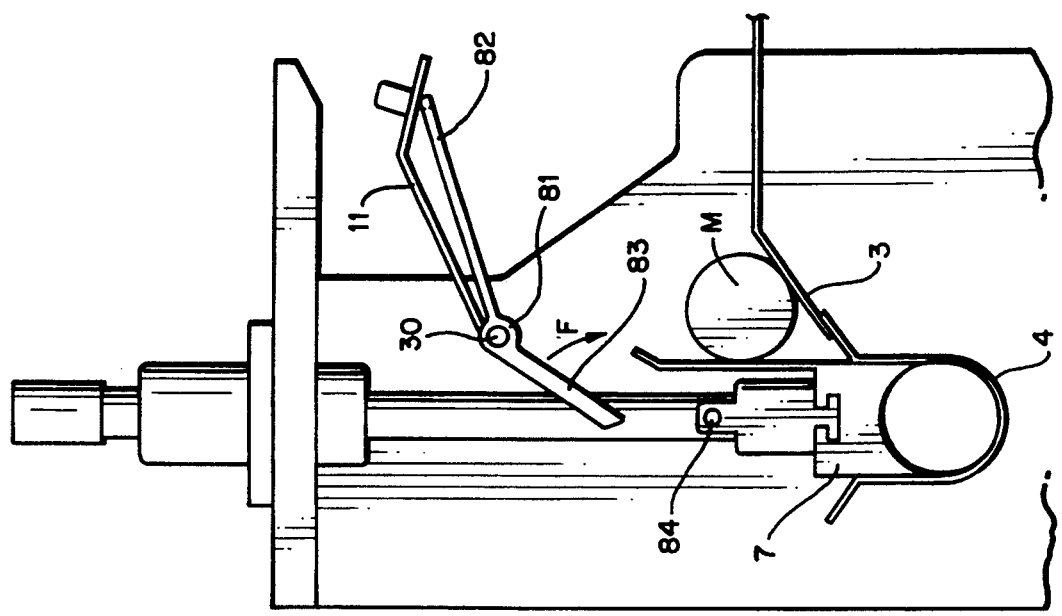
Figure 21B:
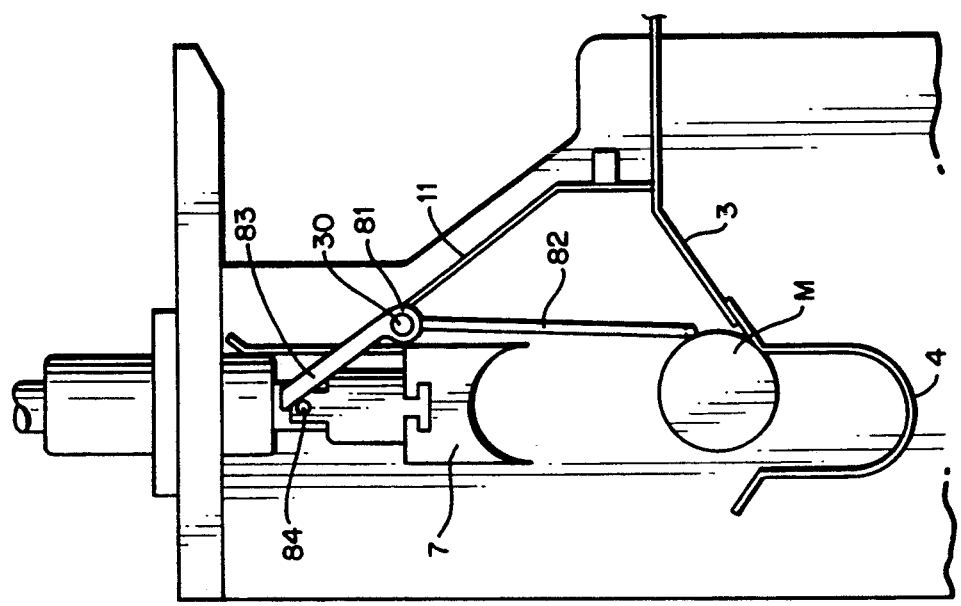
Figure 23:
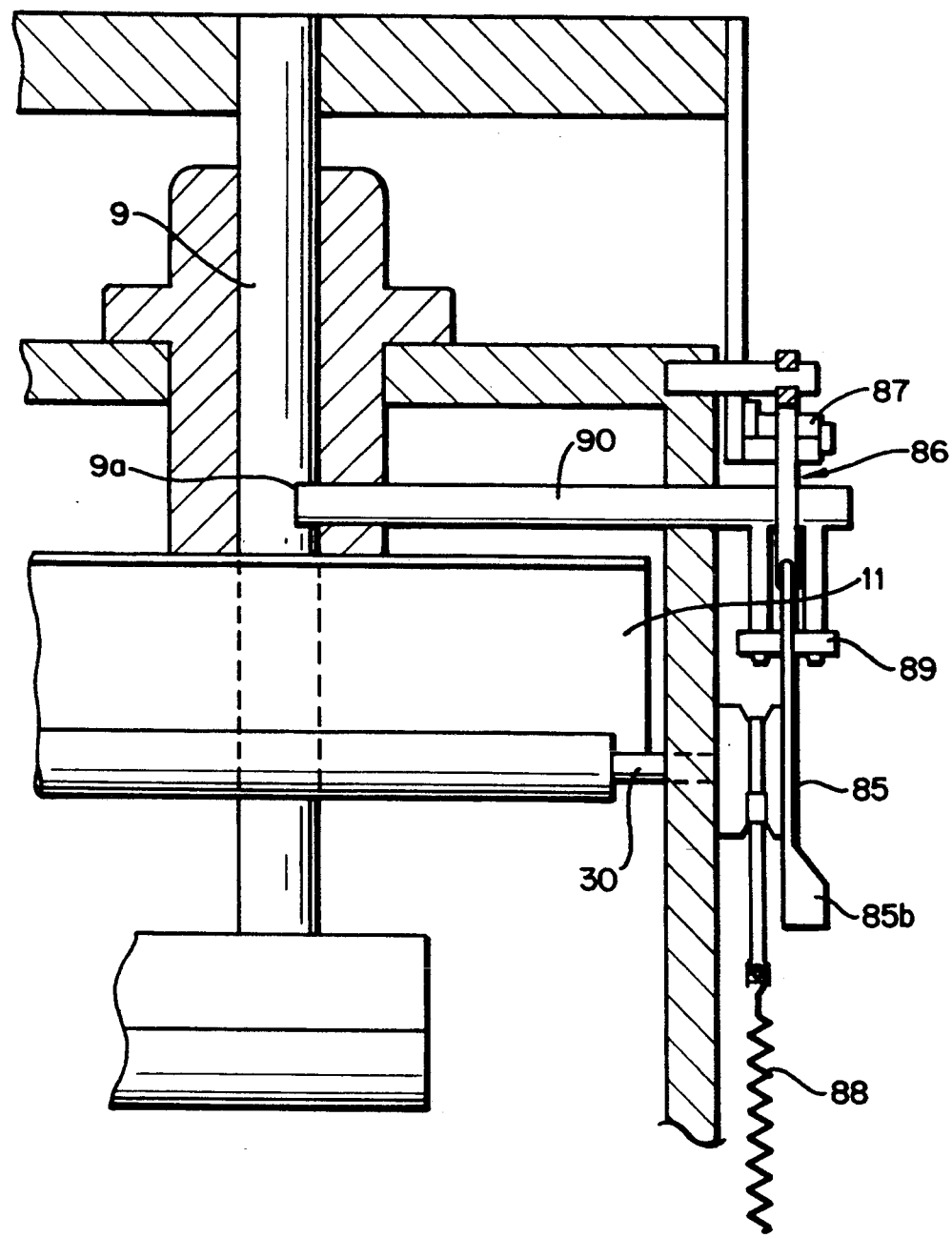
Figure 24:
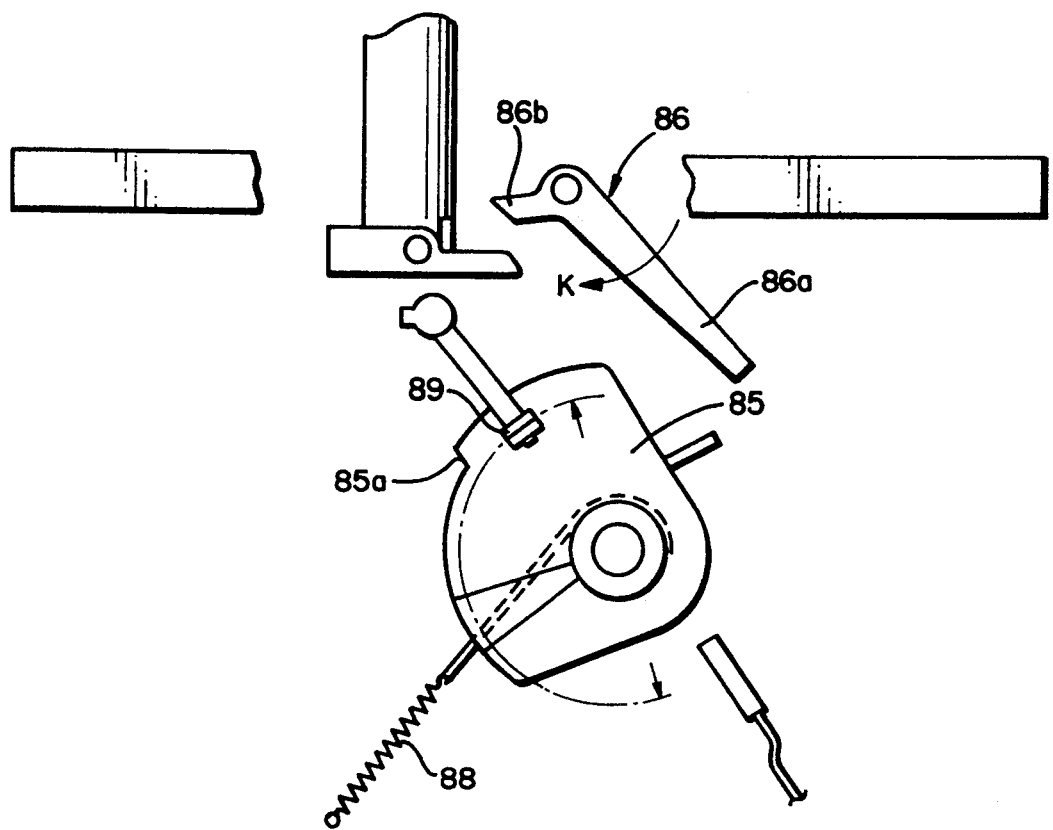
Figure 25:
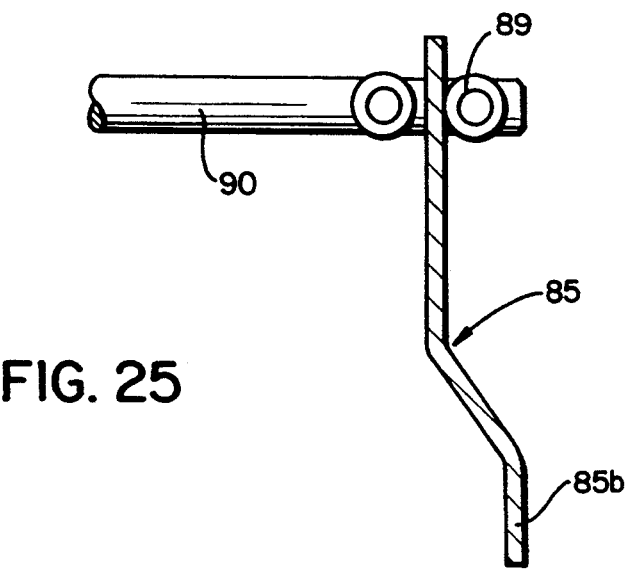
Figure 31:
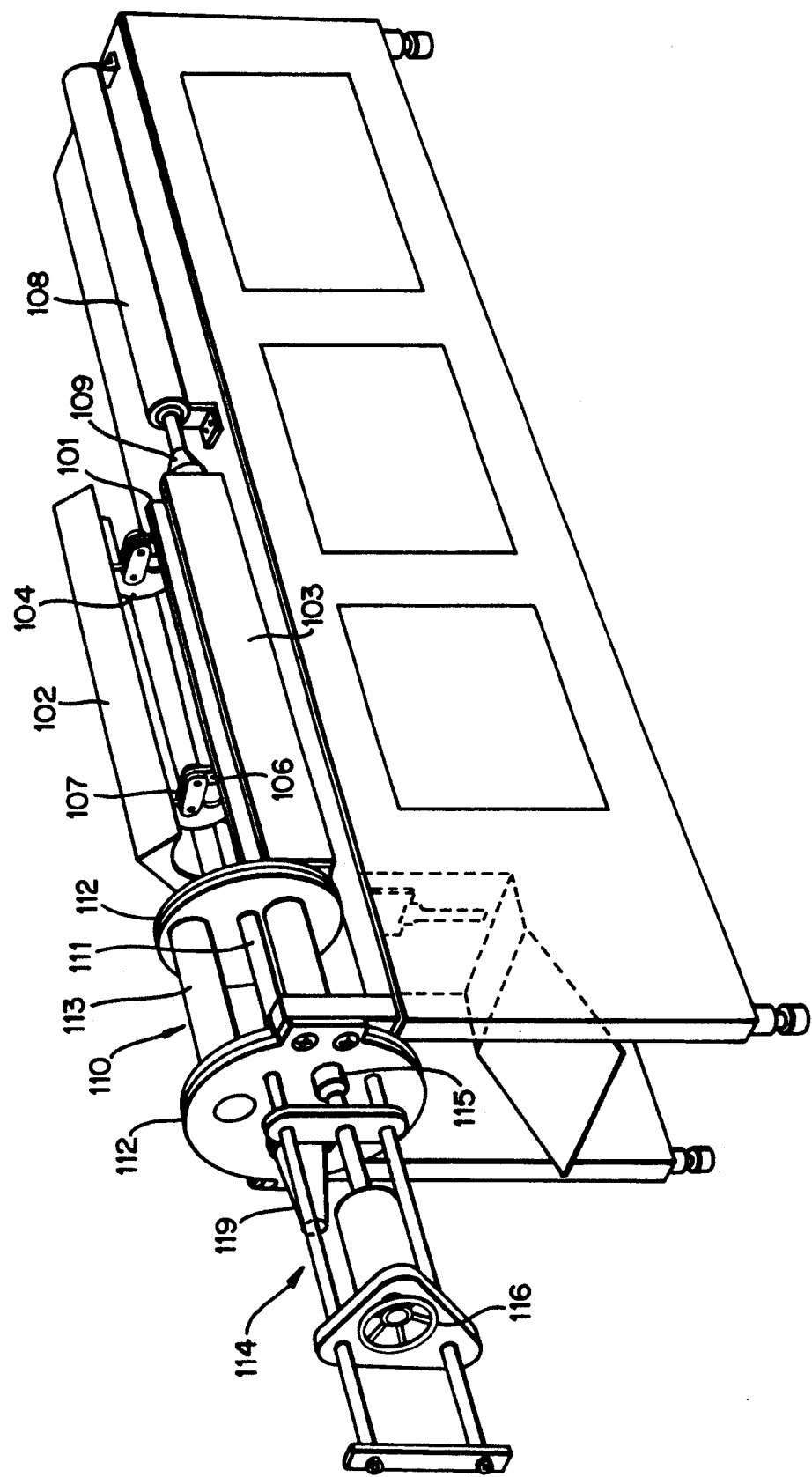
Figure 32:
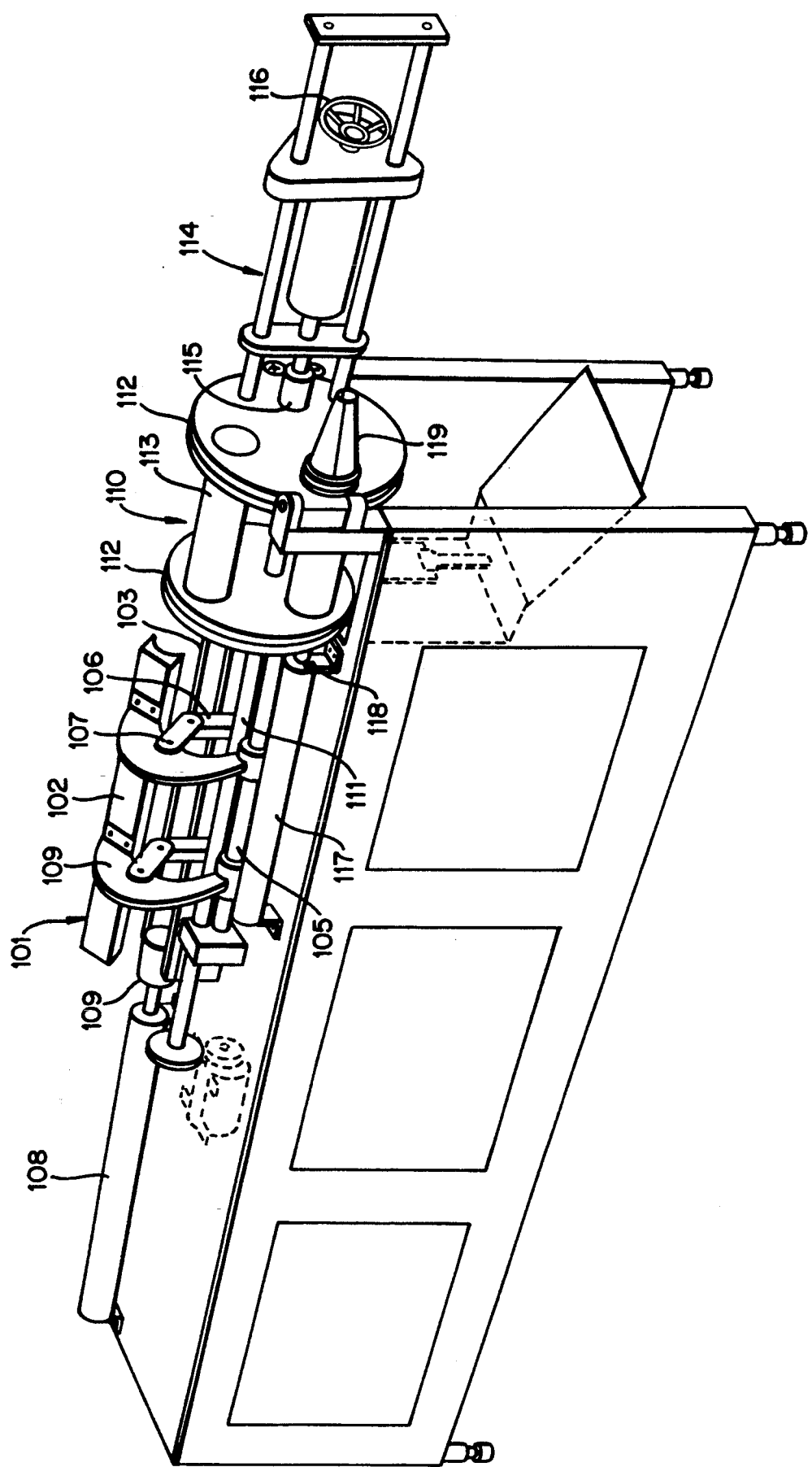
Figure 33:
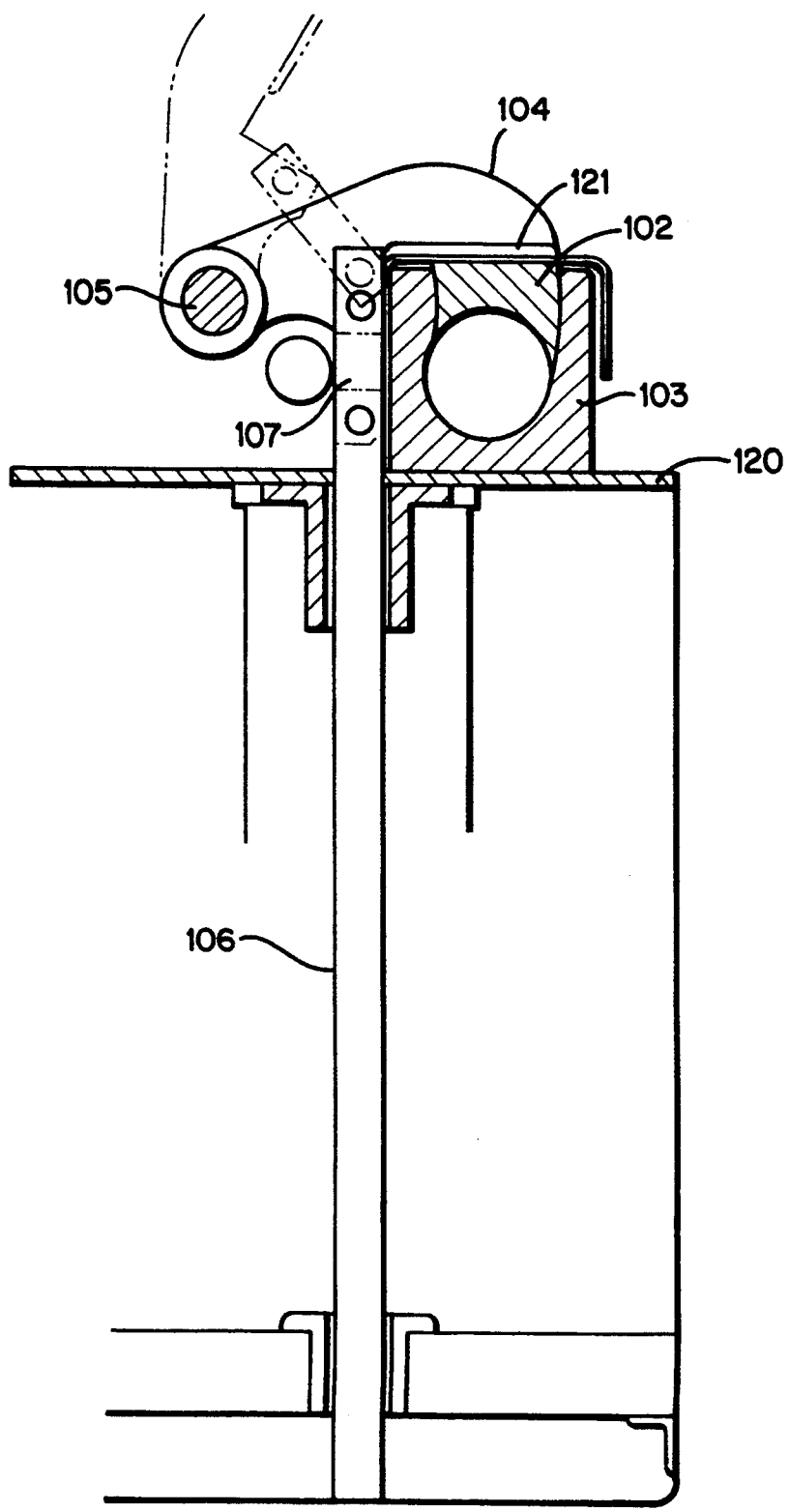
Figure 34:
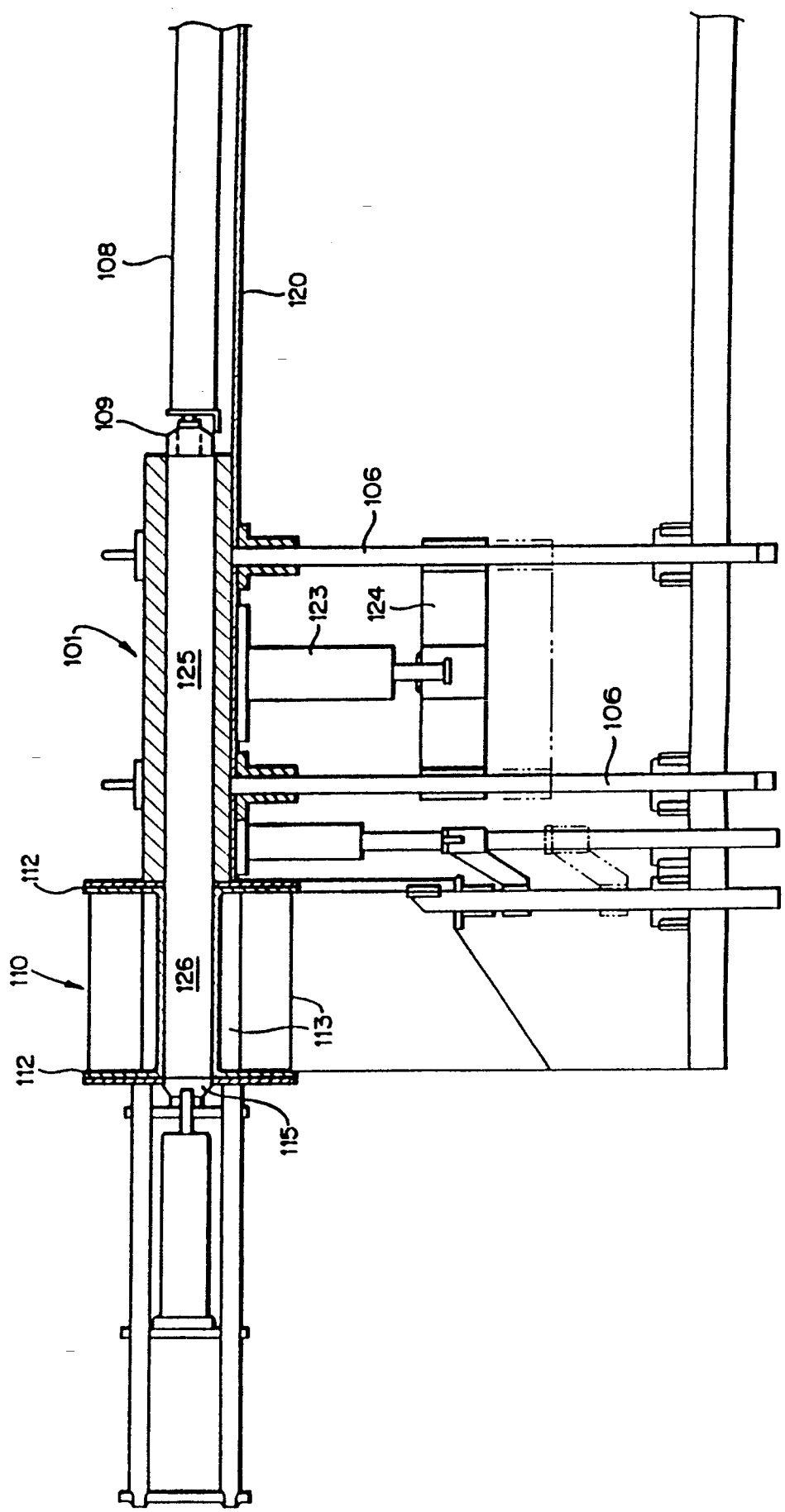
Figure 35A:
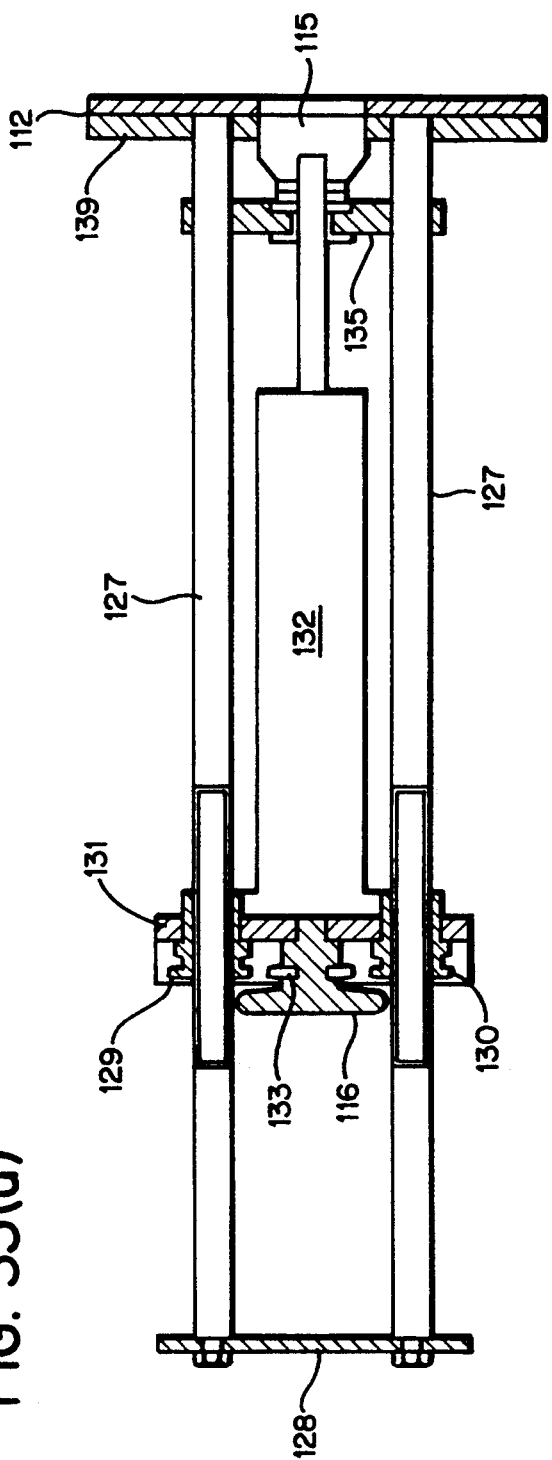
Figure 35C:
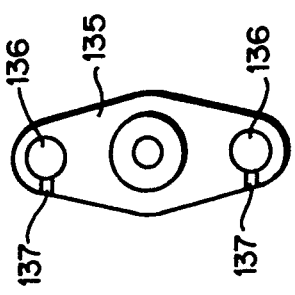
Figure 35B:
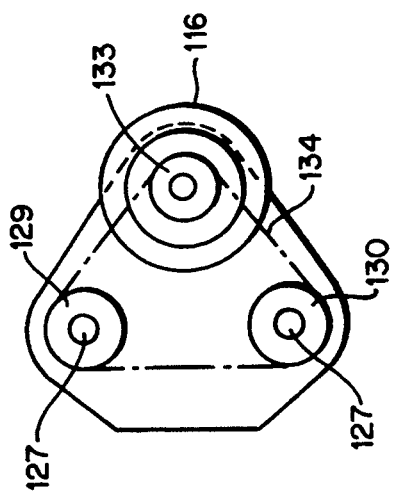
Figure 36:
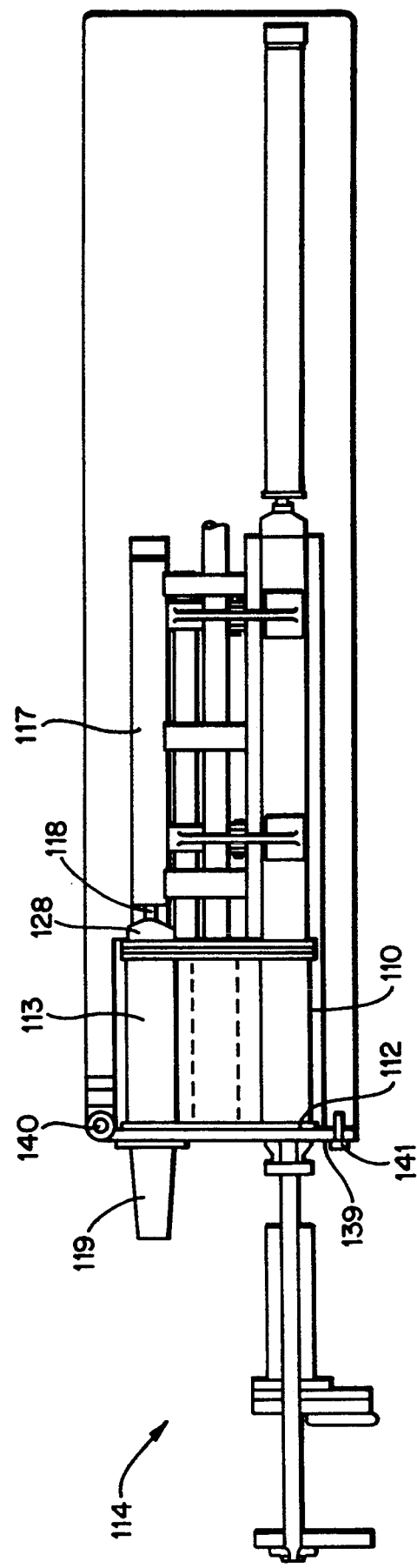

The parts (a), (b), and (c) of FIG. 13 are cross-sectional views illustrating the demounting and mounting of the upper and the lower die in accordance with the present invention;

FIG. 14 is a cross-sectional view of a displacement body in accordance with the present invention;

FIG. 15 is a cross-sectional view of a portion of the displacement body in accordance with the present invention;

The parts (a), (b), and (c) of FIG. 16 are cross-sectional views illustrating details of a changeover unit in accordance with the present invention;

FIG. 17 is a cross-sectional view illustrating a metering stopper in accordance with the present invention;

FIG. 18 is a cross-sectional view illustrating the structure for extruding the long meat mass as it is and sealing it in accordance with the present invention;

The parts (a) and (b) of FIG. 19 are cross-sectional views illustrating a structure for cleaning a rod;

FIG. 20 is a perspective view illustrating a pushing member in accordance with the present invention;

The parts (a) and (b) of FIG. 21 are partial diagrams illustrating the operation of the pushing member shown in FIG. 20;

FIG. 22 is a side elevational view illustrating another example of the mechanism of the safety cover;

FIG. 23 is a cross-sectional view of the mechanism of the safety cover shown in FIG. 22;

FIG. 24 is an enlarged side elevational view of a plate cam portion of the mechanism of the safety cover shown in FIG. 22;

FIG. 25 is an enlarged cross-sectional view illustrating the relationship of coupling between the plate cam and an abutment roller;

FIGS. 26, 27, 28, 29, and 30 are diagrams illustrating the operation of the mechanism of the safety cover of this embodiment;

FIG. 31 is a perspective view taken toward the front of a conventional publicly known manufacturing apparatus;

FIG. 32 is a perspective view taken toward the rear surface of FIG. 31;

FIG. 33 is a cross-sectional view illustrating a hopper portion;

FIG. 34 is a front elevational view, partly in section, of FIG. 31;

The part (a) of FIG. 35 is a front elevational view illustrating a variable metering device, the part (b) is a diagram illustrating the positional relationship of sprockets, and the part (c) is a front elevational view of a regulator plate;

FIG. 36 is a plan view of FIG. 31; and

Figure 37A:
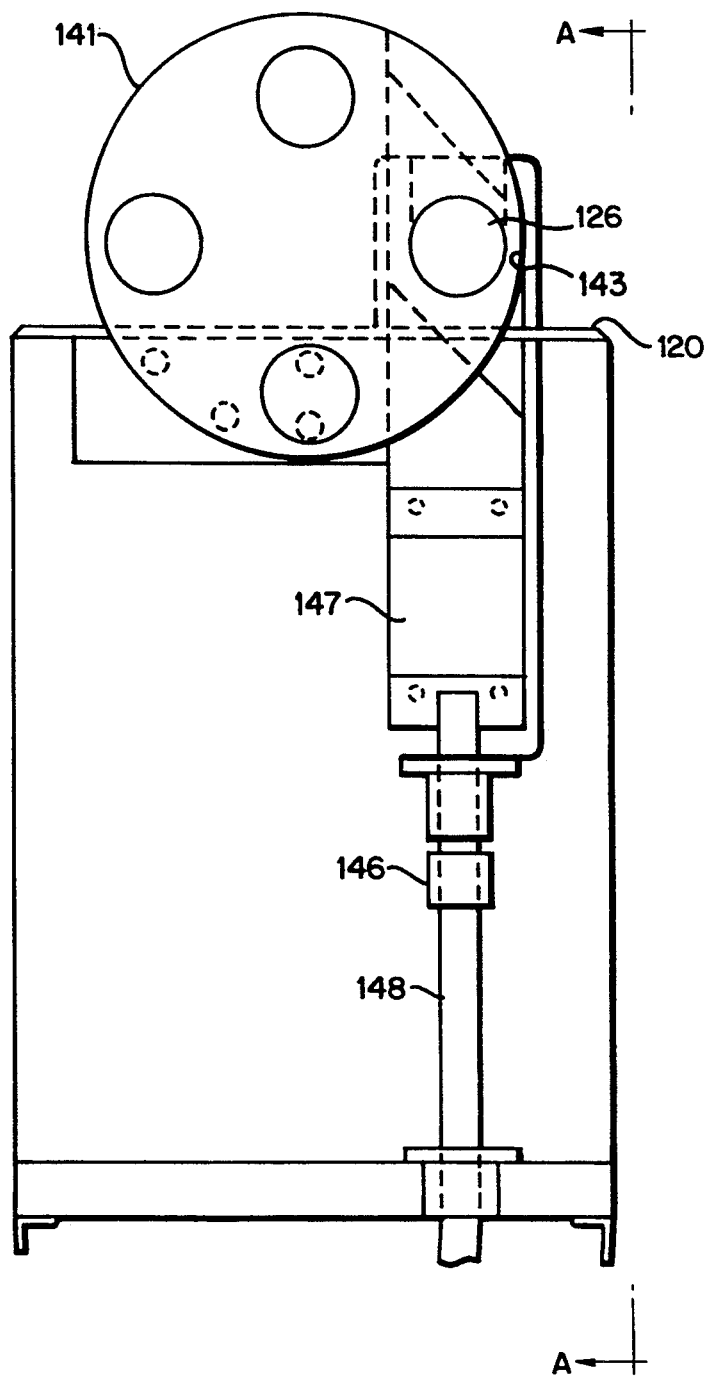
Figure 37B:
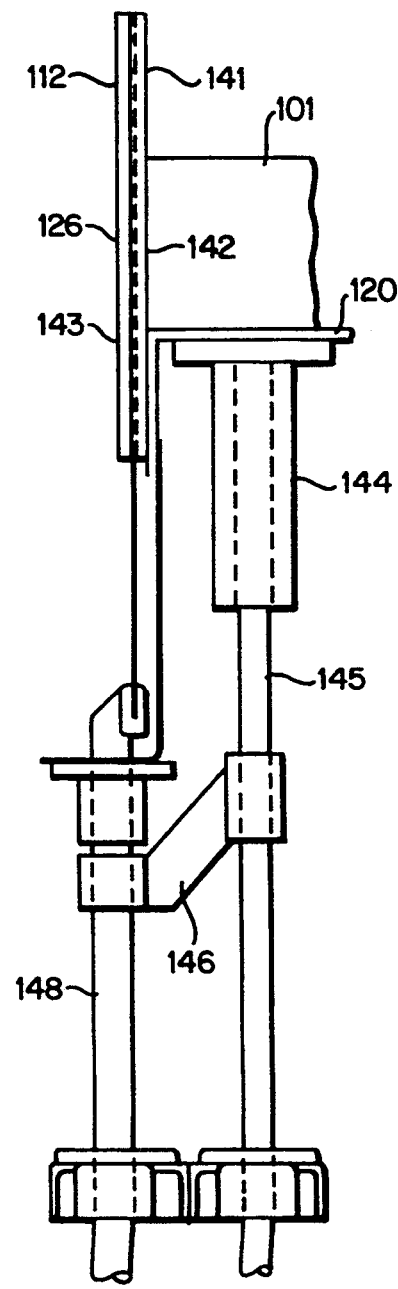

The part (a) of FIG. 37 is a front elevational view of a cutting device, while the part (b) is a diagram taken in the direction of the arrows along line A—A of the part (a).

BEST MODE OR CARRYING OUT THE INVENTION

Figure 1:
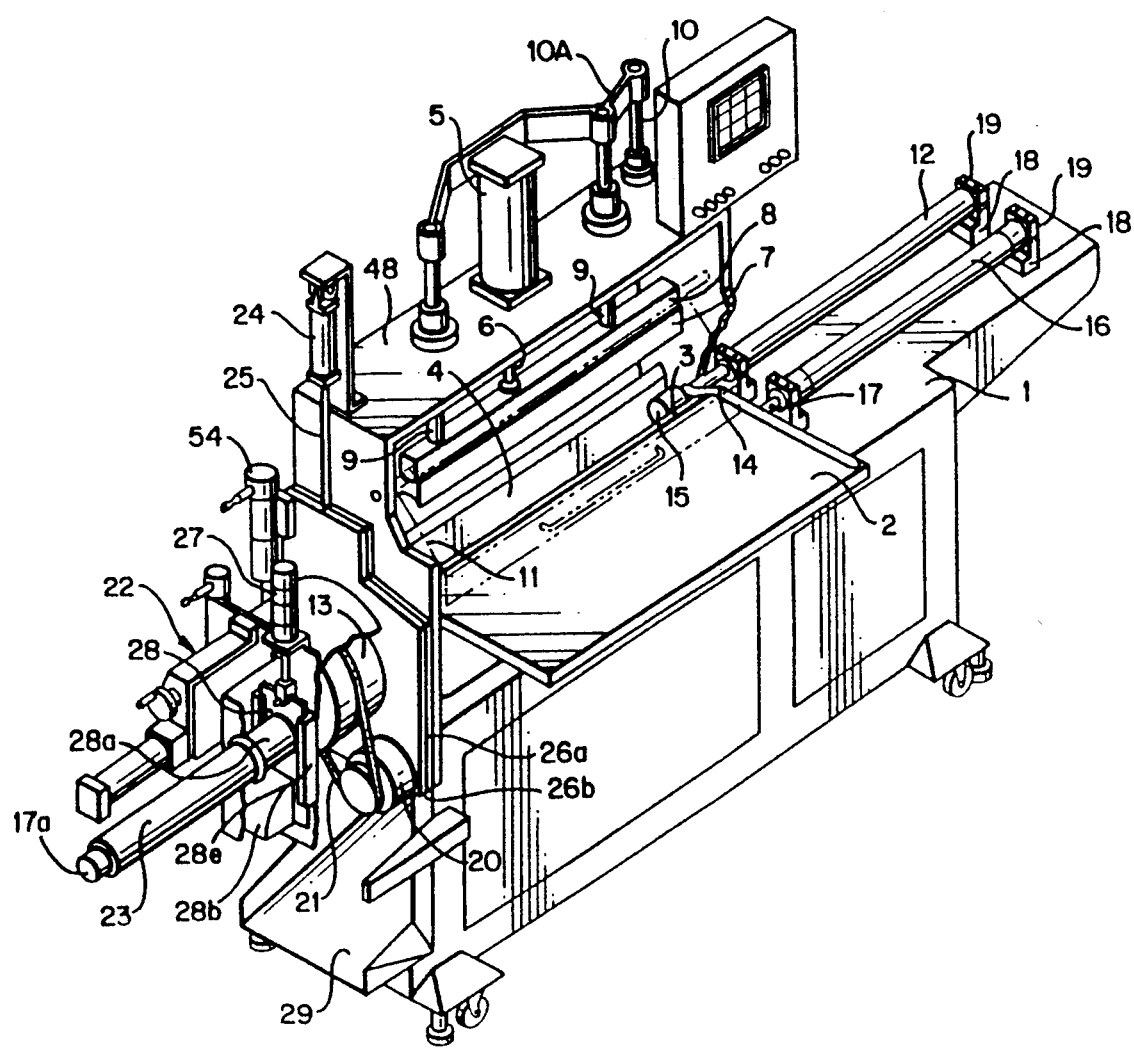
FIG. 1 is a schematic perspective view of an apparatus for manufacturing hams or the like in accordance with an embodiment of the present invention.

In FIG. 1, a processing table 2 for processing a meat mass is disposed on a base 1 of the manufacturing apparatus. An inclined placing table 3 is disposed at an end of the processing table 2, and a lower end of the placing table 3 is connected to a lower die 4. The processing table 2 is slightly inclined toward the placing table 3 so that meat pieces and meat juice can be moved simply toward the placing table 3. The placing table 3 is so designed that a meat mass M is placed thereon and is fed into the lower die 4 by making use of its inclination. An upper die 7 which is moved vertically by means of a cylinder 5 and a rod 6 is fitted in the lower die 4 to which the meat mass M has been fed, thereby to form the meat mass M. The upper die 7 is disposed detachably on a holder 8 (details thereof will be described later), and the rod 6 is secured to the holder 8. Two guide rods 9 are provided through the holder 8, and move vertically together with the upper die 7 and the holder 8. A coupling member 10A to which a linear cam 10 is affixed is secured to one of the guide rods 9, and is moved vertically together with that guide rod 9. An openable safety cover 11 which is indicated by a two-dotted dash line in the drawing is for covering the placing table 3 and the lower die 4, and ensures safety in operation by preventing the operator's hand from being nipped by the lower die 4. A force cylinder 12 is for effecting the operation of forcing the meat mass M formed by the lower die 4 and the upper die 7 into a cylindrical member (which will be described later) constituting a metering port provided in a displacement body 13. The forcing in of the meat mass M is effected by a force pusher 15 disposed detachably at an end of a rod 14 of the force cylinder 12. An extruding pusher 17a arranged detachably in the same way as the aforementioned force pusher 15 is provided at an end of a rod 17 of an extruding cylinder 16 juxtaposed with the force cylinder 12. The force cylinder 12 and the extruding cylinder 16 are detachable by means of a lower split die 18 and an upper split die 19.

The displacement body 13 is made reciprocatingly rotatable by 180° by means of a rotary actuator 20 and a wrapped-around member 21, and causes the position of the cylindrical member with the meat mass filled therein to be displaced from the position of a metering stopper 22 to the position of a discharge nozzle 23. A cutter which will be described later in detail is disposed between the lower die 4 and the displacement body 13, and the cutter is moved vertically by a cylinder 24 and a rod 25. Portions of the cutter and the rod 25 are hermetically sealed between two cases 26a, 26b secured to each other in a clamping manner. A changeover member 28, which is moved vertically by a cylinder 27, is disposed between the discharge nozzle 23 and the cylindrical member (not shown) of the displacement body 13 with the meat mass filled therein, and the changeover member 28 is comprised of a straight cylindrical portion 28a, communicating with the discharge nozzle 23, and a deflecting portion 28b bent in the shape of an elbow.

A liquid collecting plate 29 is disposed in an inclined manner underneath the placing table 3 and the lower die 4.

A description will be given of an outline of the operation of the manufacturing apparatus of the present invention shown in FIG. 1. After the meat mass M is formed into a suitable shape for feeding on the processing table 2 of the manufacturing apparatus which is stopped with the upper die 7 fitted in the lower die 4 and with the safety cover open, the meat mass M is placed in advance on the placing table 3. Then, as the safety cover 11 is closed manually, the cylinder 5 is actuated to raise the upper die 7, so that the meat mass M is automatically allowed to drop and is fed to the interior of the lower die 4. Subsequently, the upper die 7 which has been raised to a raised end is lowered and is fitted in the lower die 4, so that the meat mass M is formed into a predetermined configuration such as a circular configuration.

Then, the force cylinder 12 is actuated to fill the meat mass into the cylindrical member of the displacement body 13, and the meat mass is cut to a predetermined length by a cutter. In this case, the metering stopper 22 is actuated to adjust the quantity of the meat mass M to be filled in the cylindrical member.

Subsequently, the displacement body 13 is rotated by 180° by means of the rotary actuator 20 so that the position of the cylindrical member with the meat mass M filled therein will be placed on the discharge nozzle 23 side. Then, the extruding cylinder 16 is actuated to discharge the meat mass M filled in the cylindrical member. In this case, the straight cylindrical portion 28a of the changeover member 28 communicates with the cylindrical member and the discharge nozzle 23. In addition, in this state, another cylindrical member is at the position for filling the meat mass M, and the meat mass M is filled by the force cylinder 12.

Upon completion of the discharging of the meat mass M, the rotary actuator 20 rotates 180° in an opposite direction to effect the discharging of an ensuing meat mass and filling.

When the meat mass M is cut consecutively by the cutter, the last remaining meat does not have a necessary length. There are cases where this remaining meat is used in an ensuing filling together with a meat mass which is subsequently fed to the lower die, and cases where this remaining meat needs to be discharged separately before the aforementioned ensuing meat mass is fed.

This selection is effected by a switch on an operation panel. In the former case, if the final remaining meat located in the lower die is detected by an unillustrated sensor, the upper die is automatically raised to effect the feeding of an ensuing meat mass. In the latter case, after detection of the remaining meat by the sensor in the same way as described above, the remaining meat is forced into the cylindrical member without raising the upper die, the cylinder 27 is actuated to upwardly move the changeover member 28, and the deflecting portion 28b is made to communicate with the cylindrical member which has rotated from the filling position to the discharging position with the remaining meat filled therein. Then, as the extruding cylinder 16 is actuated, the remaining meat discharged from the cylindrical member is dropped downward from the deflecting portion 28b, and is collected.

With respect to the manufacturing apparatus of the present invention described above, a description will be given hereafter of the automatic feeding of the meat mass M to the lower die and a safety mechanism.

Referring to FIGS. 2 to 5 in addition to FIG. 1, a description will be given of a safety device of the above-described manufacturing apparatus.

Provided on a rotating shaft 30 for opening and closing the safety cover 11 is a retaining pawl 31 which rotates integrally with the rotating shaft. The retaining pawl 31 is disengageable from an engaging portion 32a of a lock 30 member 32. The lock member 32 is comprised of a sliding portion 32b pressed by a spring 33 toward the linear cam 10 side and a roller portion 32c which is bendable by being coupled to the sliding portion 32b via a pin. The roller portion 32c of the lock member 32 is reciprocated by being brought into contact with irregularities 34 of the linear cam 10, and effects the engagement and disengagement between the aforementioned retaining pawl 31 and the engaging portion 32a. The safety cover 11 is constantly urged in an opening direction by means of a spring 35.

A lock hole 9a is formed in the guide rod 9, and a lock pin 36 is provided in such a manner as to be capable of being freely brought into or out of the lock hole 9a. Two abutment rollers 37 are fixed at an end of the lock pin 36 in a face-to-face relationship, and a plate cam 38 constituted by a rotating plate is sandwiched between the abutment rollers 37. The plate cam 38 is secured to the rotating shaft 30 of the safety cover 11, and rotates integrally with the rotating shaft 30 when the safety cover 11 is opened or closed, so as to allow the lock pin 36 to be brought into or out of the lock hole 9a.

Figure 4:
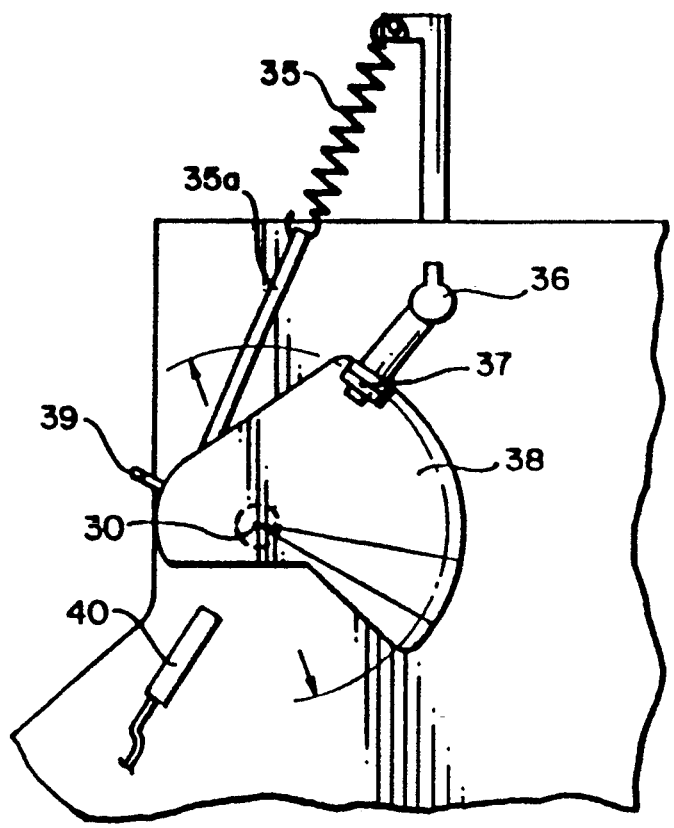
FIG. 4 is a front elevational view of a plate cam of the safety cover of the present invention.
Figure 5:
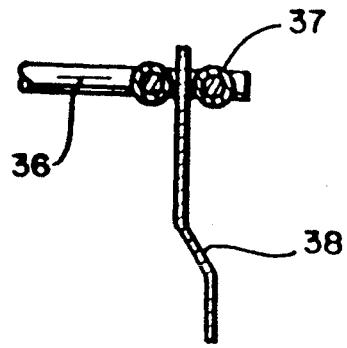
FIG. 5 is a cross-sectional view illustrating a mechanism for coupling the plate cam and a lock pin in accordance with the present invention.

In FIG. 4, a pin 39 provided on the plate cam 38 approaches a proximity of a sensor 40 at a position in which the safety cover 11 is closed after the rotation of the plate cam 38, thereby instructing the starting of movement of the upper die 7. The plate cam 38 is provided with a reeving member 38a having a conical groove around its outer periphery, and a rope 35a whose one end is secured to this reeving member 38a and which is wound therearound is connected to the spring 35.

In this embodiment, two guide rods 9 are disposed in the vicinities of opposite ends of the safety cover 11, and the plate cam 38 and the lock pin 36 are respectively disposed at one end of the safety cover 11.

Referring to the operation diagrams in FIGS. 6 to 9 as well, a description will be given of the operation of the automatic feeding of the meat mass M and safety device of the manufacturing apparatus of the present invention arranged as described above.

Figure 2:
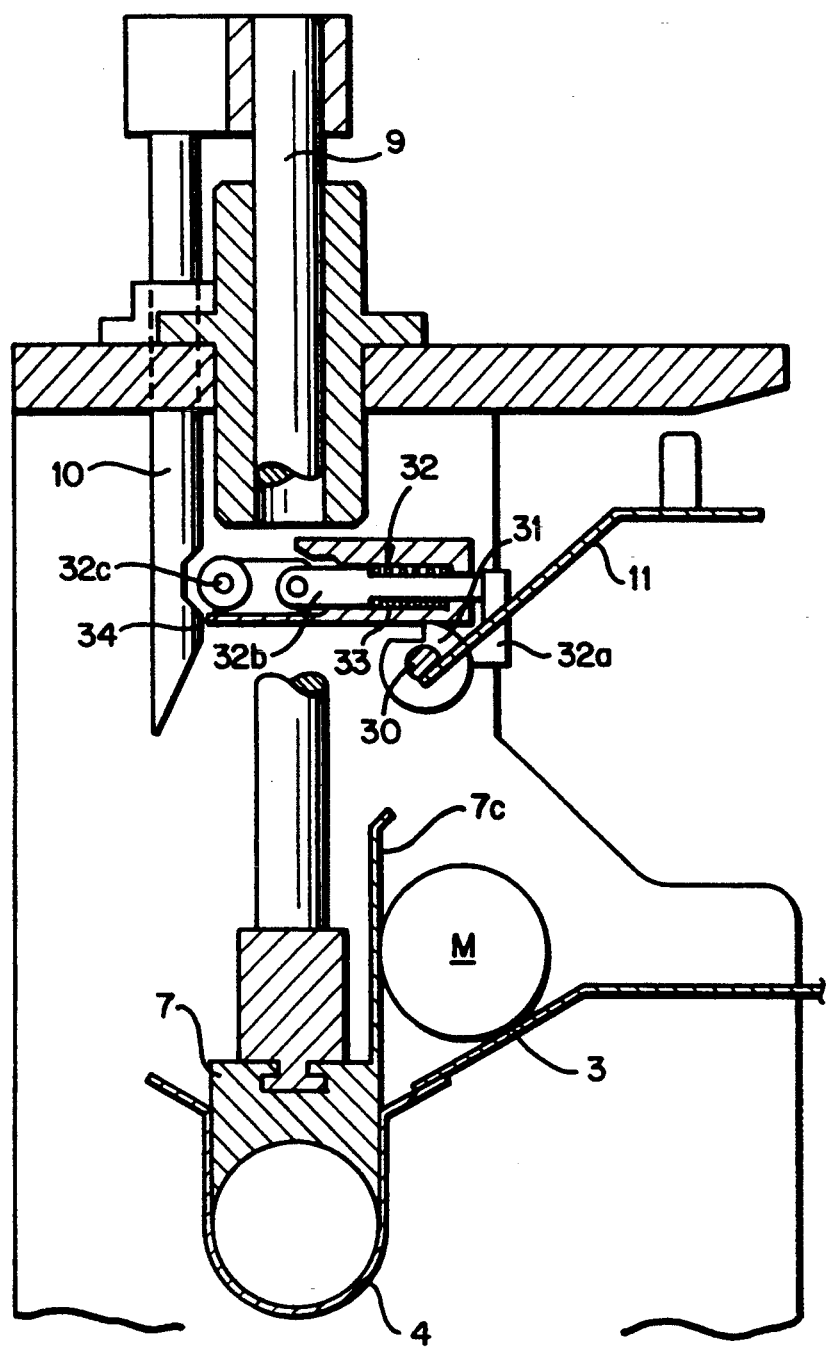
FIG. 2 is a transverse cross-sectional view illustrating the mechanism of a safety cover in accordance with the present invention.
Figure 3:
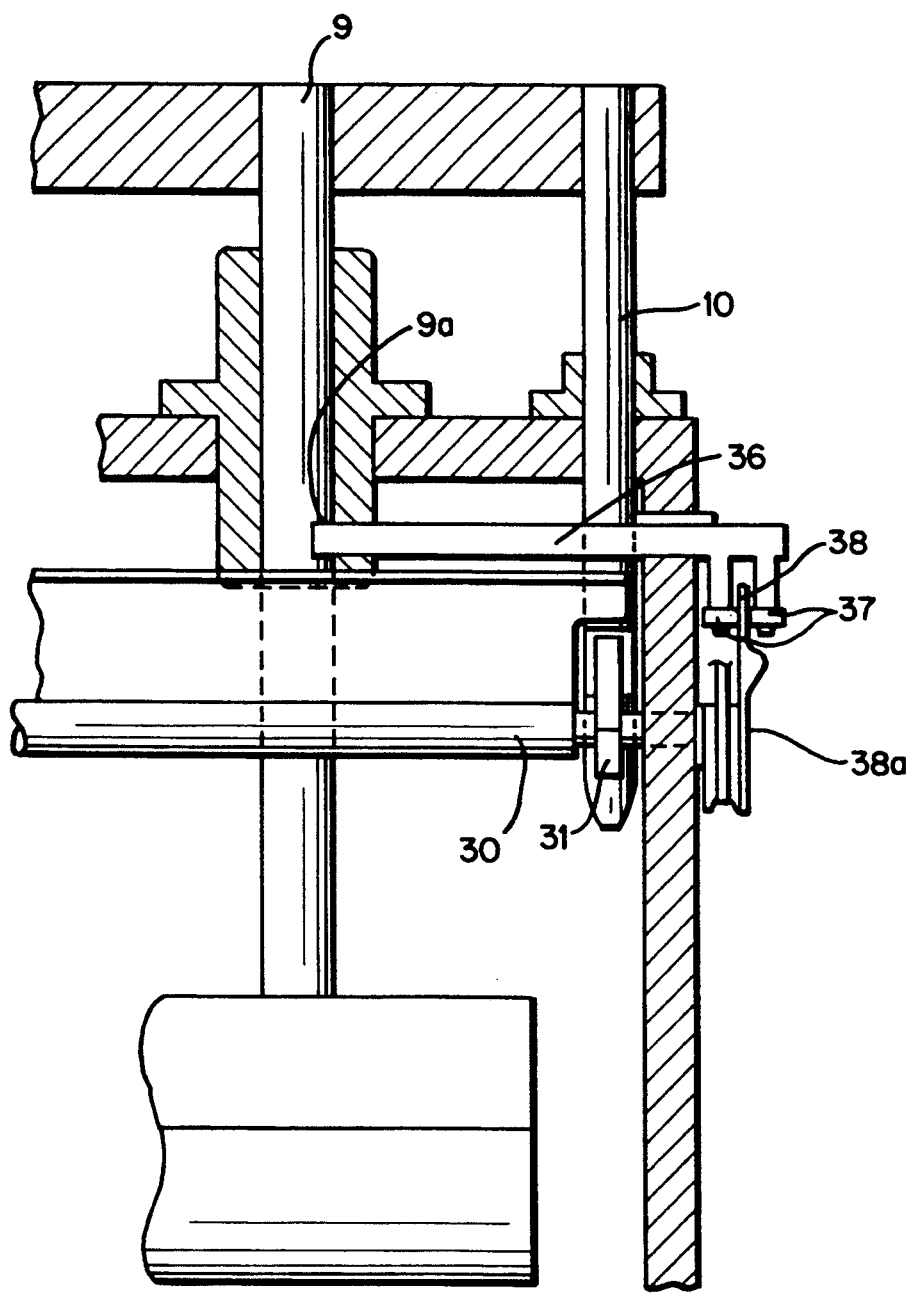
FIG. 3 is a cross-sectional view taken toward the front and illustrating the safety cover of the present invention.

First, in the state shown in FIGS. 2 and 3, the lock pin 36 is fitted in the lock hole 9a in the guide rod 9, and the engagement between the engaging portion 32a of the lock member 32 and the retaining pawl 31 is canceled. Accordingly, the safety cover 11 is opened, and the meat mass M processed on the processing table 2 is moved to the placing table 3. The meat mass M is stopped abutting against the upper die 7 or a stopper plate 7a provided on the upper die 7.

Figure 6:
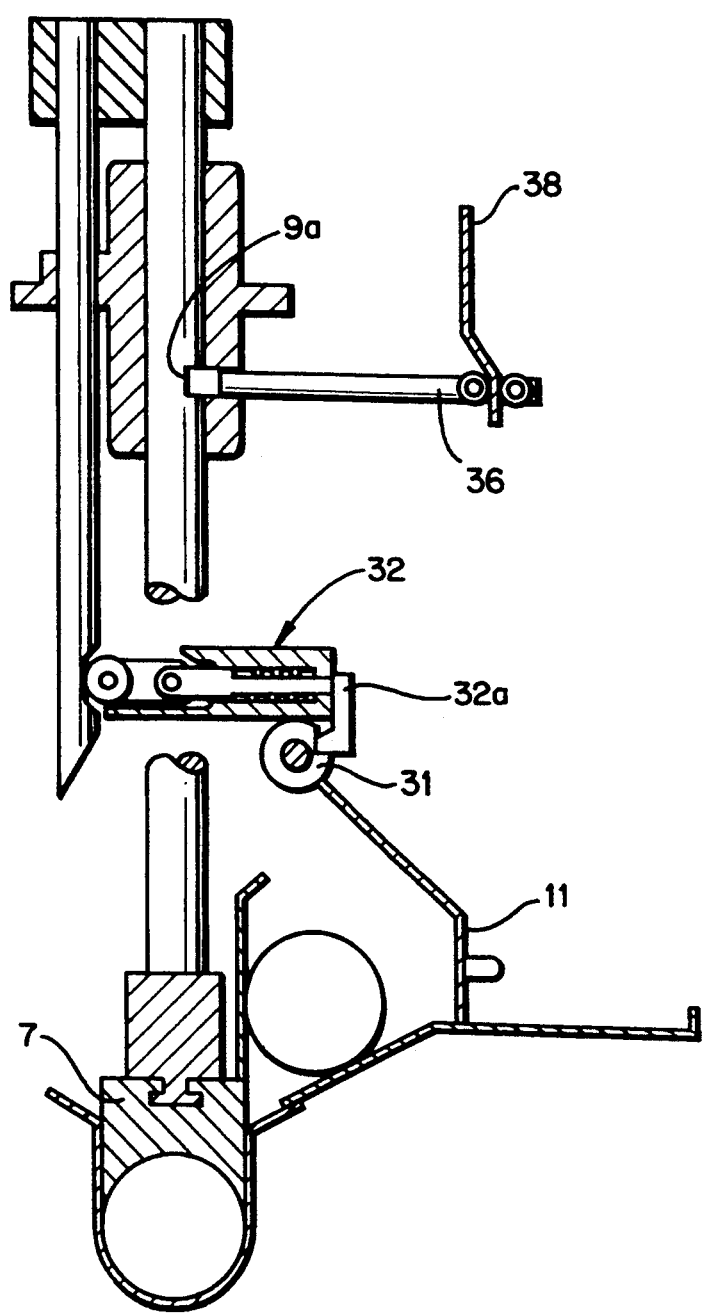

In this state, if the safety cover 11 is closed through a manual operation, the pin 39 shown in FIG. 4 approaches a proximity of the sensor 40, so that the apparatus is set in a state in which the operation can be commenced. That is, as shown in FIG. 6, the engagement between the lock pin 36 and the lock hole 9a is canceled by the plate cam 38, so that the upper die 7 starts an upward movement. In this state, the engaging portion 32a of the lock member 32 is engaged with the retaining pawl 31, and the opening operation of the safety cover 11 is prevented.

Figure 7:
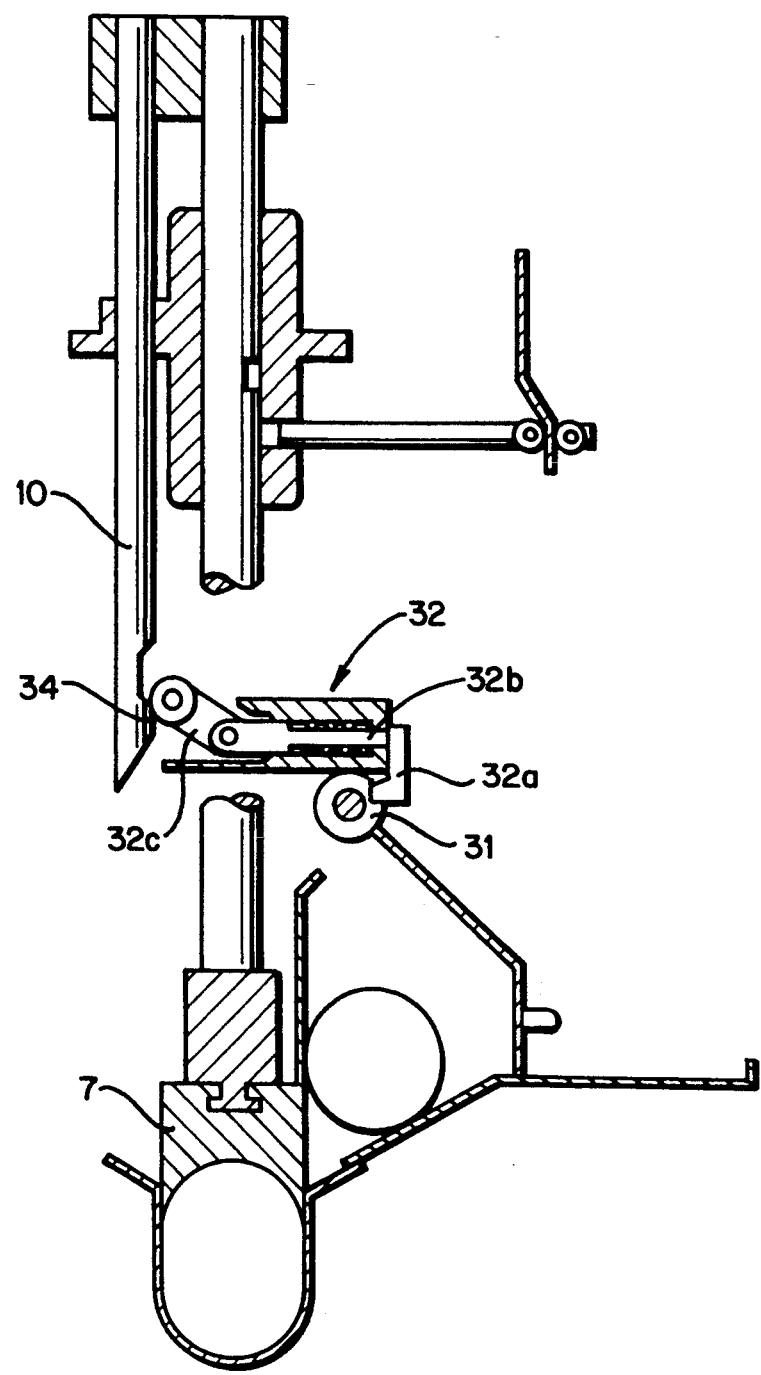

Then, as shown in FIG. 7, if the upper die 7 starts to be raised, the roller portion 32c of the lock member 32 rides over the irregularities 34 of the linear cam 10, during which the roller portion 32c is bent with respect to the sliding portion 32b, so that the engagement between the engaging portion 32a of the lock member 32 and the retaining pawl 31 is not canceled. The bending of this roller portion 32c occurs only during the upward movement of the linear cam 10, and does not occur during the downward movement of the linear cam 10.

When the upper die 7 is further raised, the meat mass M stopped by the upper die 7 drops into the lower die 4, as shown in FIG. 8, and is hence automatically fed.

Figure 9:
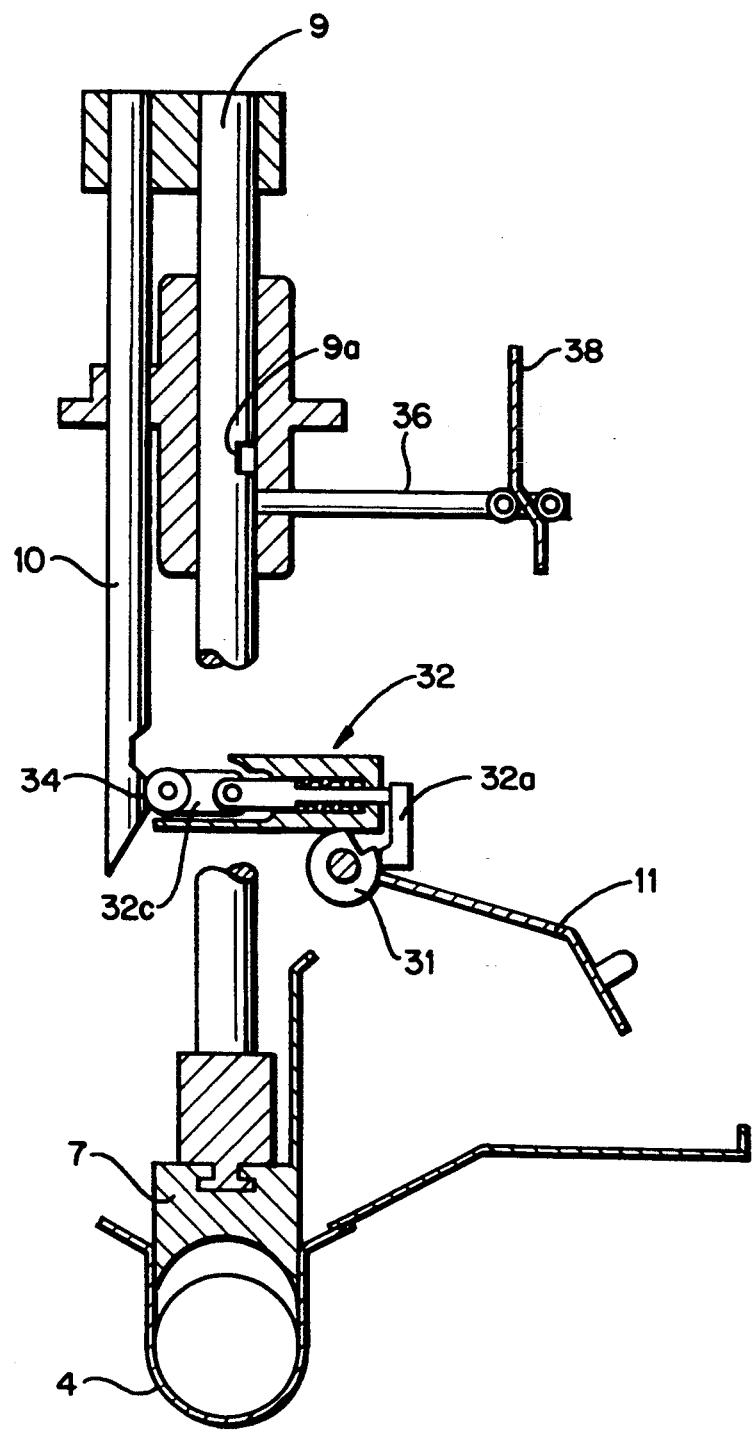

Subsequently, when the upper die 7 is lowered and the upper die 7 reaches a position in which it is fitted in the lower die 4, as shown in FIG. 9, the roller portion 32c of the lock member 32 rides over the irregularities 34 of the linear cam 10, which in turn causes the disengagement between the engaging portion 32a and the retaining pawl 31, with the result that the opening operation of the safety cover 11 is started by means of the spring 35. The plate cam 38 which rotates integrally with the opening operation of the safety cover 11 moves the lock pin 36 toward the lock hole 9a in the guide rod 9. At this time, since the lock hole 9a has reached the position of the lock pin 36, the lock pin 36 is fitted into the lock hole 9a by the plate cam 38, as shown in FIGS. 2 and 3. As a result, in the event that an attempt is made through an operational error of the operator to raise the upper 7 during the state when the safety cover 11 is open, the lock pin 36 prevents the rising of the upper die 7.

Next, referring to FIGS. 1, 10, and 11, a description will be given of a hermetically sealing structure of the cutter and a structure for preventing the leakage of meat juice and meat pieces from the cutter portion.

A cylindrical portion 4a formed at an end of the lower die 4 is fitted in the case 26a secured to a side portion of a frame 48 disposed uprightly on the base 1, of the two cases 26a, 26b for clamping and accommodating a portion of the rod 25 and a cutter blade 41 of the cutter, and a seal ring 42 is provided at that fitting portion. In addition, the displacement body 13 is fitted in the case 26b, and a seal ring 43 is provided at that fitting portion as well. The aforementioned cutter blade 41 and the portion of the rod 25 are arranged in a recessed portion 44 formed in the interior of the two cases 26a, 26b in such a manner as to be vertically movable. A bush 45 through which the rod 25 slides is provided at a joint between the two cases where the rod 25 is inserted, and a sealing member 46 is provided between the bush 45 and the rod 25. In this embodiment, the cutter blade 41 has a rectangular configuration, and a circular cutting port 41a having the same diameter as that of the cylindrical portion 4a of the lower die 4 and that of the metering port is provided therein in an open manner. It should be noted that an opening 47 shown in FIG. 10 is an opening through which the extruding pusher 17a provided on the end of the rod 17 of the extruding cylinder 16 is inserted.

In accordance with the hermetically sealed structure of the cutter and the structure for preventing leakage from the cutter portion in the present invention arranged as described above, the cutter blade 41 is accommodated in the interior of the two cases 26a, 26b and is not exposed to the outside even if it is moved vertically, so that no danger is presented. In addition, since the displacement body 13 and the rod 25, i.e., a sliding member for allowing the recessed portion 44 formed in the interior of the cutter cases and the outside of the cases to communicate with each other, are respectively sealed by the seal rings 46 and 43, meat pieces and meat juice are prevented from leaking to the outside from the cutter portion in accordance with the above-described structure, although the meat pieces and meat juice are produced when the meat mass is forced into the metering port in the displacement body 13 or the meat mass is cut by the cutter blade 41.

Figure 11:
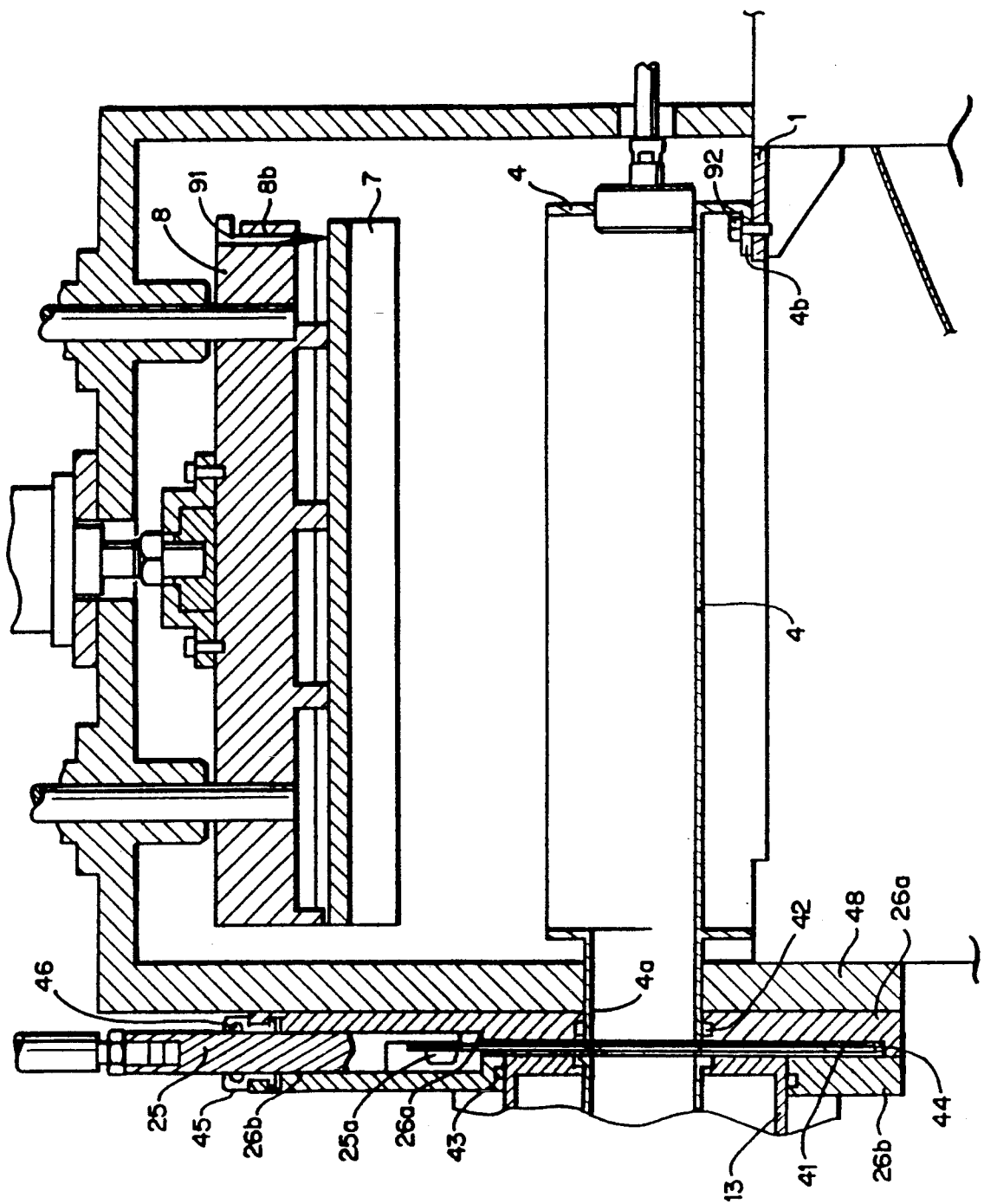
FIG. 11 is a cross-sectional view illustrating the demounting and mounting of an upper and a lower die and a structure for hermetically sealing the cutter portion in accordance with the present invention.
Figure 12:
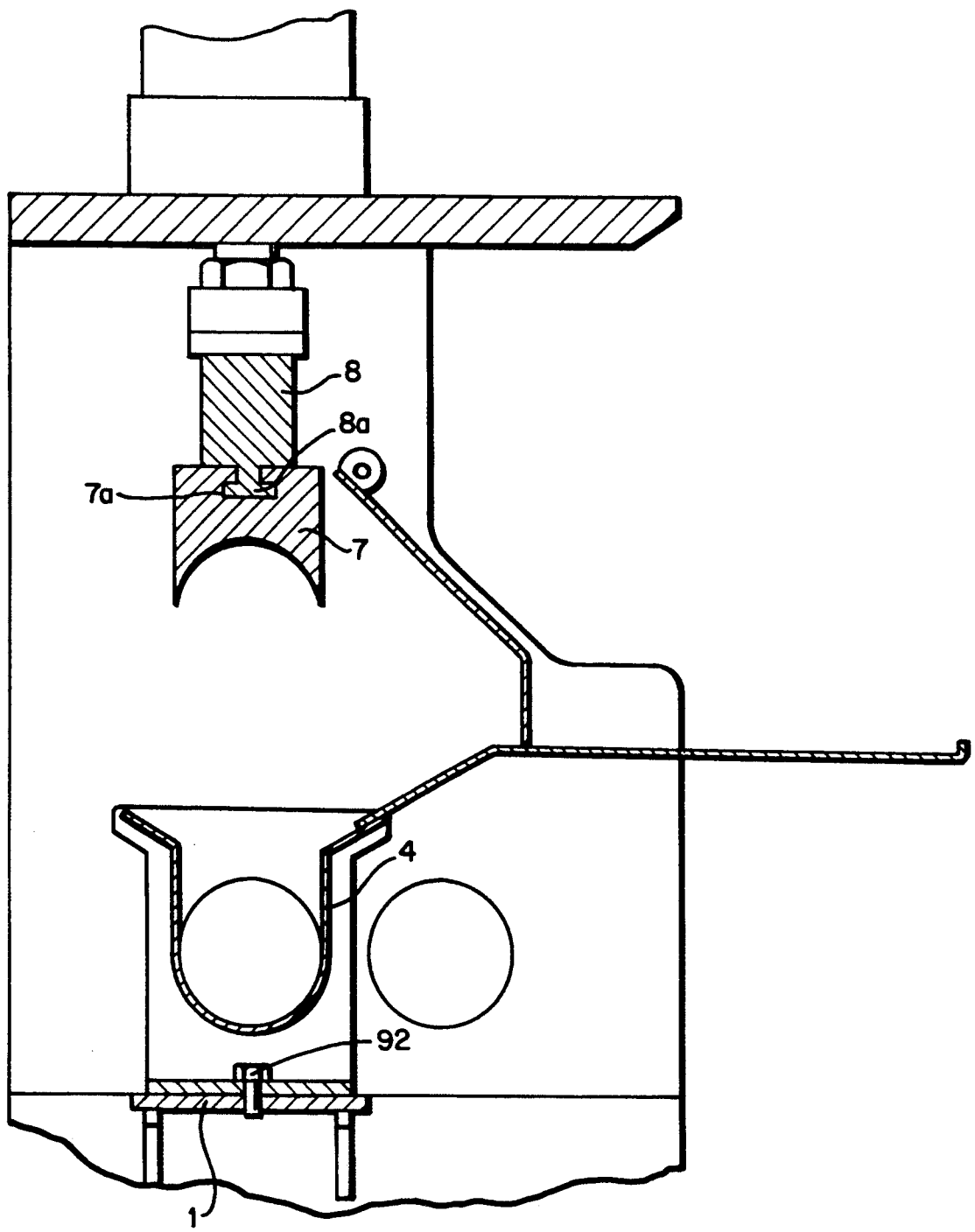
FIG. 12 is a cross-sectional view illustrating a structure for demounting and mounting the upper and the lower die in accordance with the present invention.

Next, referring to FIGS. 11, 12, and the parts (a), (b), and (c) of FIG. 13, a description will be given of a structure for mounting and demounting the upper and lower dies.

A guide groove 7a is formed in the upper die 7 and a plurality of guides 8a provided on parts of the holder 8 are slidably fitted in the guide groove 7a. A stopper pin 91 is inserted in an insertion hole 8b formed at an end of the holder 8, and as the stopper pin 91 abuts against the upper die 7, the sliding of the upper die 7 is prevented. The lower die 4 is secured to the base 1 by means of a set screw 92. The set screw 92 is inserted through an elongated hole 4b formed in the lower die 4, and the lower die 4 carl be moved in the rightward direction in FIG. 11 simply by slightly loosening the set screw 92. As a result, the cylindrical portion 4a formed at the end of the lower die 4 can be withdrawn from the case 26a and the frame 48. The parts (a) to (c) of FIG. 13 show details of the structures of the guide groove 7a formed in the upper die 7 and the guides 8a formed on the holder 8, notched ports 7b being formed in the guide groove 7a located on one side of the upper die 7. In addition, the width of the guide 8a provided on the holder 8 is smaller than the width of the aforementioned notched port 7b, and the guides 8a are provided by being positioned such that all the guides 8a are located in the respective notched ports 7b when one guide 8a is located in one notched port 7b.

A description will be given below of the demounting and mounting of the upper and lower dies in the manufacturing apparatus of the present invention arranged as described above.

In the present invention, the arrangement provided is such that in the state in which the upper die 7 is fitted in the lower die 4, the two are demounted or mounted as a unit. Namely, if the set screw 4b securing the lower die 4 is loosened, and the stopper pin 91 securing the upper die 7 is withdrawn, the upper die 7 and the lower die 4 become slidable as a unit along the guide groove 7a. Then, the upper die 7 and the lower die 4 are both moved as a unit, and are moved such that the guides 8a provided on the holder 8 are located at the positions of the notched ports 7b formed in the guide groove 7a. Through this movement, the cylindrical portion 4a of the lower die 4 is withdrawn from the case 26a and the frame 48, and the upper die 7 and the lower die 4 are moved leftward in FIG. 13(a) in such a manner that they are withdrawn as a unit from the guides 8a of the holder 8.

Since the operation of mounting the upper die 7 and the lower die 4 is the reverse of the above-described demounting operation, a description thereof will be omitted.

Next, referring to FIG. 14, a description will be given of a structure for mounting and demounting a metering cylinder which is a cylindrical member for forming the metering port, a structure for cleaning the cutter, and a structure for rotating and supporting the displacement body.

A metering cylinder 49 constituting the metering port into which the meat mass M is filled is cylindrical in shape, and a flange 49a is formed at one end thereof. Two insertion holes are formed in the displacement body 13, and the metering cylinder 49 is inserted in that insertion hole. Holes for bolts 50 are provided in the flange 49a of the metering cylinder 49, and the metering cylinder 49 is secured to the displacement body 13 by means of the bolts 50. The displacement body 13 is accommodated in the interior of a frame casing 51, and bearings 52 are disposed between the frame casing 51 and the displacement body 13 to rotatably support the displacement body. The case 26b and a stopper case 53 are disposed at opposite ends of the frame casing 51, respectively, and the case 26b is secured integrally with the frame casing 51. A sprocket 13a is disposed around an outer periphery of the displacement body 13, the sprocket 13a being a reeving portion around which the chain 21 (see FIG. 1), i.e., the wrapped-around member, is wound. In this embodiment, the chain is illustrated as the wrapped-around member, but it is possible to use a belt, a timing belt, or the like as the wrapped-around member. In addition, as the transmission mechanism, it is also possible to adopt other transmission mechanism such as a gear transmission mechanism. The case 26b is openably secured to the case 26a, which is affixed to the frame 48, by means of a hinge portion 54. A retaining bolt 55 is provided to secure the case 26b onto the case 26a. In addition, the stopper case 53 is openably secured to the frame casing 51 by means of a hinge portion 56. A retaining bolt 57 is provided to secure the stopper case 53 to the frame casing 51.

With respect to the manufacturing apparatus of the present invention arranged as described above, a description will be given of the demounting and mounting of the metering cylinder.

In the illustrated state, the retaining bolt 55 is first removed. Then, the frame casing 51 becomes openable by means of the hinge portion 54, and is opened between the case 26b and the case 26a. Then, if the bolts 50 are removed, the metering cylinder 49 can be pulled out from the insertion hole of the displacement body 13.

With respect to the mounting of the metering cylinder 49, the operation is effected in a reverse order of the above-described demounting, so that a description thereof will be omitted.

Figure 10:
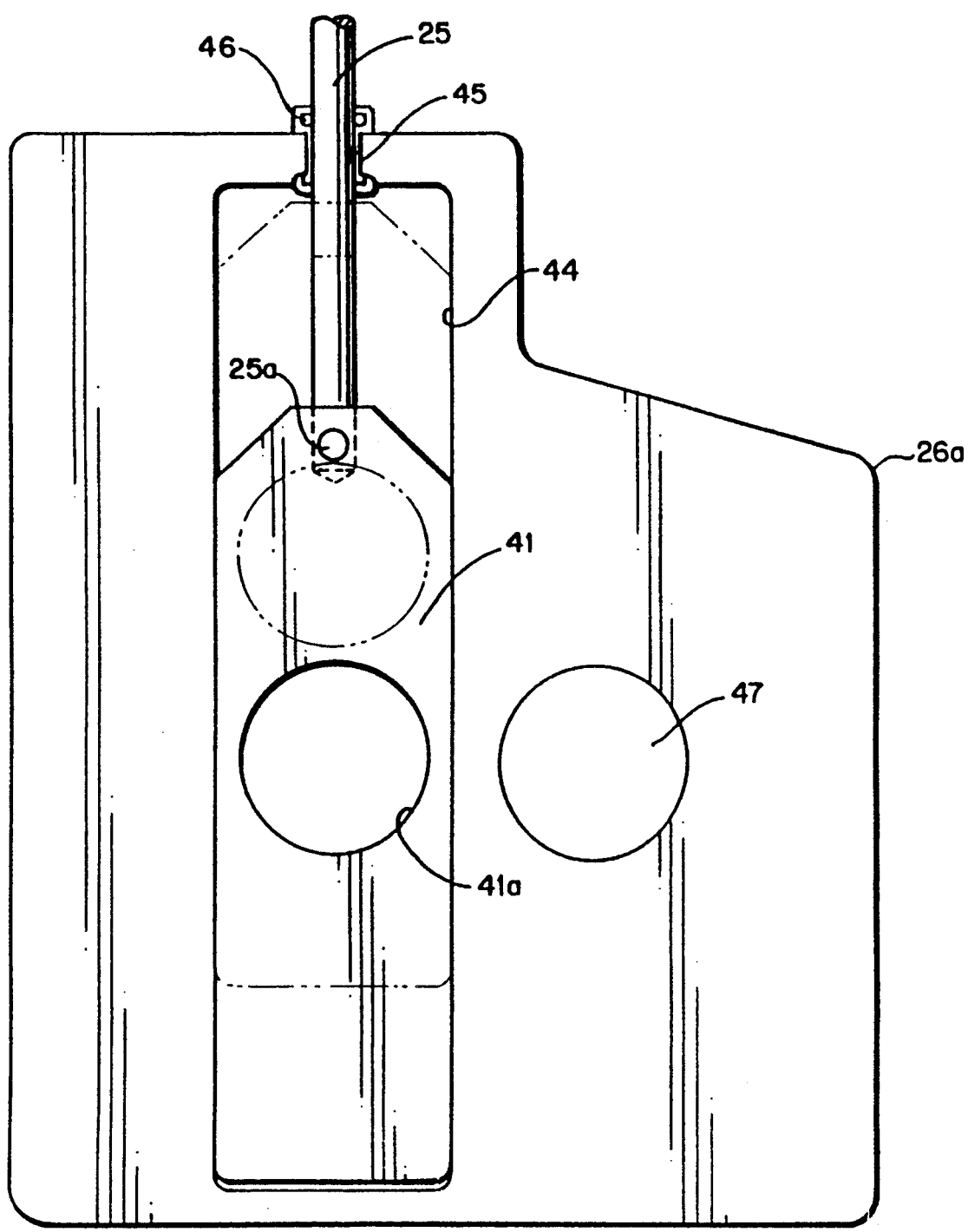
FIG. 10 is a front elevational view of a cutter portion in accordance with the present invention.

Then, in the cleaning of the cutter, since the state in which the frame casing 51 in the drawing is opened is the state of FIG. 10, the cutter blade 41 is removed in this state, and the cleaning of the recessed portion 44 is performed. Referring also to FIG. 11, since the cutter blade 41 is merely coupled to a pin 25a of the rod 25, it can be fitted or removed easily. In addition, since the cylinder 24 shown in FIG. 1 is secured through pin coupling, the rod 25 together with the bush 45 is swingable toward this side in FIG. 10, no hindrance is caused to the cleaning of the recessed portion 44.

Since the rotational support of the displacement body 13 is effected on the outer periphery of the displacement body 13, the center shaft of the displacement body 13 is omitted, so that it is possible to obtain a compact displacement body 13.

Next, referring to FIG. 15 in addition to FIG. 14, a description will be given of the swinging rotation of the displacement body 13 by 180° and a mechanism for stopping the same.

A colliding portion 58 is disposed on an outer periphery of the displacement body 13. This colliding portion 58 is adapted to collide against two shock absorbers 59 disposed on the frame casing 51 such as to opposing each other at 180°.

To describe the operation of the above-described arrangement, when the filling of the meat mass (or the discharging of the meat mass) is completed in the state of FIG. 15, the rotary actuator 20 is actuated to rotate the displacement body 13 counterclockwise by means of the chain 21, and the colliding portion 58 hence collides against the other shock absorber 59 and is stopped. Then, when the discharging of the meat mass (or the filling of the meat mass) is completed, the rotary actuator 20 is actuated again to rotate the displacement body 13 in the opposite direction, and the colliding portion 58 hence collides against the shock absorber 59 and is stopped. The changeover of the rotating direction of the rotary actuator 20 is effected by means of an unillustrated controller.

Next, referring to the parts (a), (b), and (c) of FIG. 16 in addition to FIG. 1, a description will be given of a device for discharging the remaining meat.

In the manufacturing apparatus in accordance with the present invention, there are cases where the remaining meat which is short of a dimension is used by being added as it is to the new meat mass in the ensuing cycle, and cases where the remaining meat is discharged without being used by being added.

Accordingly, the changeover member 28 is provided between the discharge nozzle 23 and the outlet port in the metering cylinder which is located at the position where the meat mass is extruded. The changeover member 28 has the straight cylindrical portion 28a for allowing the outlet port in the metering cylinder and the discharge nozzle 23 to communicate with each other and the deflecting portion 28b for causing the remaining meat filled in the metering cylinder to be deflected downward so as to be discharged. In this embodiment, the deflecting portion 28b is constituted by an elbow pipe in which both side portions are closed by side plates and which is downwardly open by means of a curved plate, so that the meat mass extruded does not reach the inlet port in the discharge nozzle 23. The straight cylindrical portion 28a and the deflecting portion 28b are disposed on a base plate 28c, which is secured to a rod 27a of the cylinder 27 via a pin coupling fixture 28d. The base plate 28c is fitted in a groove in a guide 28e affixed to the stopper case 53, in such a manner as to be vertically slidable.

The operation of discharging remaining meat in the manufacturing apparatus of the present invention arranged as described above is as follows.

Now, during the usual extrusion of the meat mass, the changeover member 28 is at the position in the part (b) of FIG. 16, and the straight cylindrical portion 28a is at the position of the outlet port in the metering cylinder. For this reason, the meat mass extruded from the metering cylinder is forced to the discharge nozzle 23 via the straight cylindrical portion 28a, is discharged from the end of the discharge nozzle 23, and is sealed into an unillustrated casing placed over the discharge nozzle 23.

Next, when the remaining meat (scrap meat) of less than a predetermined length which remains in the lower die 4 is detected by an unillustrated sensor provided in the force cylinder 12, the cylinder 27 is actuated to upwardly move the changeover member 28 so as to set it at the position in the part (c) of FIG. 16. Then, the outlet port in the metering cylinder is aligned with the deflecting portion 28b. The aforementioned scrap meat filled in the metering cylinder is made to pass through the deflecting portion 28b and is dropped and discharged downward by the operation of the extruding cylinder 16.

Then, referring to FIG. 17, a description will be given of the metering stopper 22 of the manufacturing apparatus of the present invention.

The metering stopper 22 controls the length of the meat mass to be filled into the metering cylinder 49, and is arranged such that a stopper piston 60 is made to advance into the interior of the metering cylinder 49 and stop at a predetermined position, and the meat mass is forced in so as to be pressed against the stopper piston 60.

The stopper piston 60 is disposed at a tip of a rod 62 of a cylinder 61, and the stopper piston 60 is disposed by being located at the outlet port in the metering cylinder 49 into which the meat mass is filled. A colliding member 63 is disposed on the rod 62, and collides against an abutment member 64 when the rod 62 is extended, so as to restrict the length of extension of the rod 62 (the degree of length by which the stopper piston 60 enters the interior of the metering cylinder 49). The abutment member 64 is threadedly engaged with a threaded shaft 66 which is rotated by a handle 65, and the arrangement provided is such that as the handle 65 is rotated, the position of the abutment member 64 moves to the left or right in the drawing. A rod member 67 is provided in such a manner as to penetrate the abutment member 64 so as to receive an impact occurring to the abutment member 64. The rotation of the threaded shaft 66 is locked by means of a retaining bolt 66a. The aforementioned threaded shaft 66, abutment member 64, and cylinder 61 are affixed to a metering frame 68 secured to the stopper case 53. The rod member 67 is provided with graduations 67a, and the arrangement provided is such that the position of movement of the abutment member 64 is determined by means of an indicator needle 64a provided on the abutment member 64, thereby to determine the length of entrance (in other words, the length of the meat mass to be filled) of the stopper piston 60 into the metering cylinder 49.

A description will be given of the operation of the metering stopper of the present invention arranged as described above.

First, after the lock of the threaded shaft 66 is canceled by loosening the retaining bolt 66a the handle 65 is rotated to set the position of the abutment member 64 to a predetermined position, and the threaded shaft 66 is locked again. Then, if the cylinder 61 is actuated, the rod 62 is extended, and the extension stops when the rod 62 is extended until the colliding member 63 collides against the abutment member 64 (the two-dotted dash line in FIG. 17), and the stopper piston 60 stops at a predetermined position in the metering cylinder 49 (the stopper piston indicated by the two-dotted dash line in FIG. 17). In this state, if the meat mass is filled, the length of the meat mass filled is set.

When changing the length of the meat mass to be filled, it suffices if the handle 65 is rotated to change the stop position of the abutment member 64.

It should be noted that when the displacement body 13 undergoes swinging rotation, the stopper piston 60 is kept retracted by means of the cylinder 61, as in the case of the publicly known manufacturing apparatus.

In accordance with the above-described structure, the impact of the stopper piston 60 acts on the rod member 67, and the impact acting on the threaded shaft 66 is reduced, so that the durability of the threaded shaft 66 is improved, and no hindrance is caused to the movement of the abutment member 64.

In addition, referring to FIG. 18, a description will be given of an apparatus for extruding the long meat mass as it is and sealing it into the casing by means of the apparatus of the present invention.

FIG. 18 shows the apparatus in a state in which the displacement body is not provided, and shows a state in which the displacement body is opened via the hinge 54 in FIG. 14, for instance. In this state, the cutter blade 41 of the cutter shown in FIG. 10 is taken out, and a discharge nozzle 69 is secured to the recessed portion of the case 26a where the cutter blade 41 was provided. The other constructions are identical to those of the above-described apparatus.

According to this apparatus, the meat mass can be discharged from the discharge nozzle 69 and can be sealed into the long casing.

Finally, referring to the parts (a) and (b) of FIG. 19, a description will be given of the cleaning of the rod 14 of the force cylinder 12.

Meat pieces and meat juice adhere to the rod 14 of the force cylinder 12. If the rod 14 with these substances adhering thereto enters the force cylinder 12, there is the possibility of giving rise to instability in operation, so that a tank 70 in which a high-temperature liquid is stored is provided at an end of the force cylinder 12, and the rod 14 is disposed in such a manner as to penetrate that tank 70. The tank 70 has a circular hole wall 70a through which the rod 14 is passed, and a plurality of openings 70b are provided in the hole wall 70a. A plurality of scrapers 71 are disposed between the hole wall 70a and the rod 14, and the scrapers 71 act to seal off the high-temperature liquid and to scrape off the meat pieces and meat juice adhering to the rod 14. A heater 72 is provided in an end portion of the tank 70, and a temperature sensor is provided via a lead wire 73. A liquid discharge port 74 is provided in a bottom portion of the tank 70, and the arrangement provided is such that the high-temperature liquid in the tank 70 is discharged by means of a cock 75 provided in the liquid discharge port 74.

In the present invention, the following structure may be adopted in addition to the above-described structure.

In the automatic feeding of the meat mass M in the above-described embodiment, the meat mass M is adapted to roll on the placing table constituted by an inclined surface, so as to be fed into the lower die. However, depending on the condition of the meat mass M, cases occur in which the meat mass M adheres to the placing table and fails to roll. In such a case, a structure is provided such that a pushing member such as the one shown in next FIGS. 20 and 21 is provided on the inner side of the safety cover so as to feed the meat mass M forcibly into the lower die by means of that pushing member.

Namely, referring to FIG. 20, a cylindrical member 81 is rotatably fitted over the rotating shaft 30, in the vicinity of each opposite end thereof, of the safety cover 11, and the cylindrical member 81 is provided with a pushing member 82 and an arm 83 also serving as a rotating weight. The arm 83 serves as the rotating weight to constantly impart a rotation moment indicated by reference character F to the cylindrical member 81. For this reason, the Rushing member 82 undergoes a rotating motion integrally with the opening and closing operation of the safety cover 11. The pushing member 82 is disposed on the inner side of the safety cover 11. Abutment members 84 are provided on the upper die 7, and the arm 83 extends with a length for abutment against the abutment member 84. It should be noted that although, in this embodiment, the arm 83 is so constructed as to be formed integrally with the cylindrical member 81, the arm 83 may be constructed separately therefrom.

Referring to FIG. 21 as well, a description will be given of the operation of the pushing member 82 arranged as described above.

As shown in the part (a) of FIG. 21, when the upper die 7 is fitted in the lower die 4, the safety cover 11 is openable, and the pushing member 82 also undergoes the rotating motion together with the safety cover 11. This safety cover 11 is opened, the meat mass M is placed on the placing table 3, and the safety cover 11 is set in a closed state.

Then, when the meat mass M is fed to the lower die 4, the upper die 7 moves upward, as shown in the part (b) of FIG. 21. Then, the abutment members 84 disposed on the upper die 7 are brought into contact with the arms 83 and raise the same, thereby causing the pushing member 82 to undergo a rotating motion so as to forcibly feed the meat mass M into the lower die 4. It should be noted that even if the inclined surface of the placing table 3 of the apparatus of this embodiment is made into a flat surfacer the feeding of the meat into the lower die is possible.

Next, a description will be given of another embodiment of the safety mechanisms for the feeding of the meat mass M into the lower die and the opening and closing of the safety cover.

Referring to FIGS. 22 to 25, the rotating shaft 30 for opening and closing the safety cover 11 is provided with a plate cam 85 adapted to rotate integrally with that rotating shaft. An engaging stepped portion 85a and a cam ridge 85b are formed on the plate cam 85. A lock member 86, which is disposed rotatably, is constantly urged in such a manner as to rotate in the direction indicated by arrow K (see FIG. 24) by means of gravity. One end of the lock member 86 constitutes an engaging pawl 86a for engaging with and disengaging from the engaging stepped portion 85a, while the other end thereof constitutes an abutment portion 86b for abutment with a lock canceling member 87 which vertically moves integrally with the upper die 7. The plate cam 85 is constantly rotated and urged in the direction in which the safety cover 11 opens, by means of a spring 88. Abutment rollers 89 are disposed with the plate cam 85 placed therebetween. The abutment rollers 89 are secured to a lock pin 90, with the result that the lock pin 90 is capable of being brought into or out of the lock hole 9a of the guide rod 9 by means of the plate cam 85 and the abutment rollers 89.

Referring to the operation diagrams in FIGS. 26 to 30 in addition to FIGS. 22 to 25, a description will be given of the feeding of the meat mass M and the operation of the safety device in accordance with the other embodiment of the present invention arranged as described above.

Figure 26:
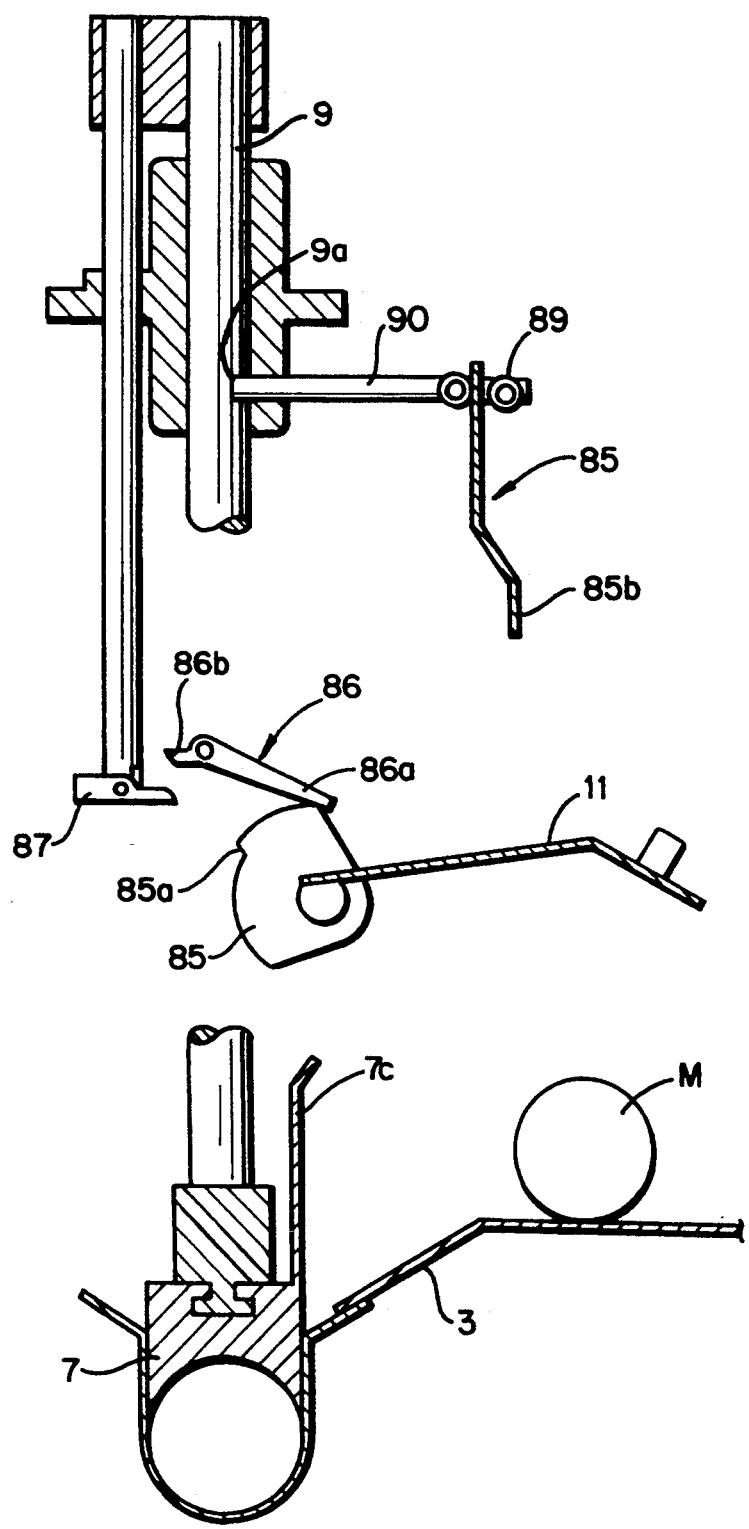

First, in the state of FIG. 26, the lock pin 90 is fitted in the lock hole 9a in the guide rod 9, and the engagement between the engaging pawl 86a of the lock member 86 and the engaging stepped portion 85a of the plate cam 85 is canceled. Accordingly, the safety cover 11 is opened by the spring 88, and the meat mass M is moved to the placing table 3. The meat mass M abuts against, and is stopped at, the upper die 7 or a stopper plate 7c provided on the upper die 7.

Figure 27:
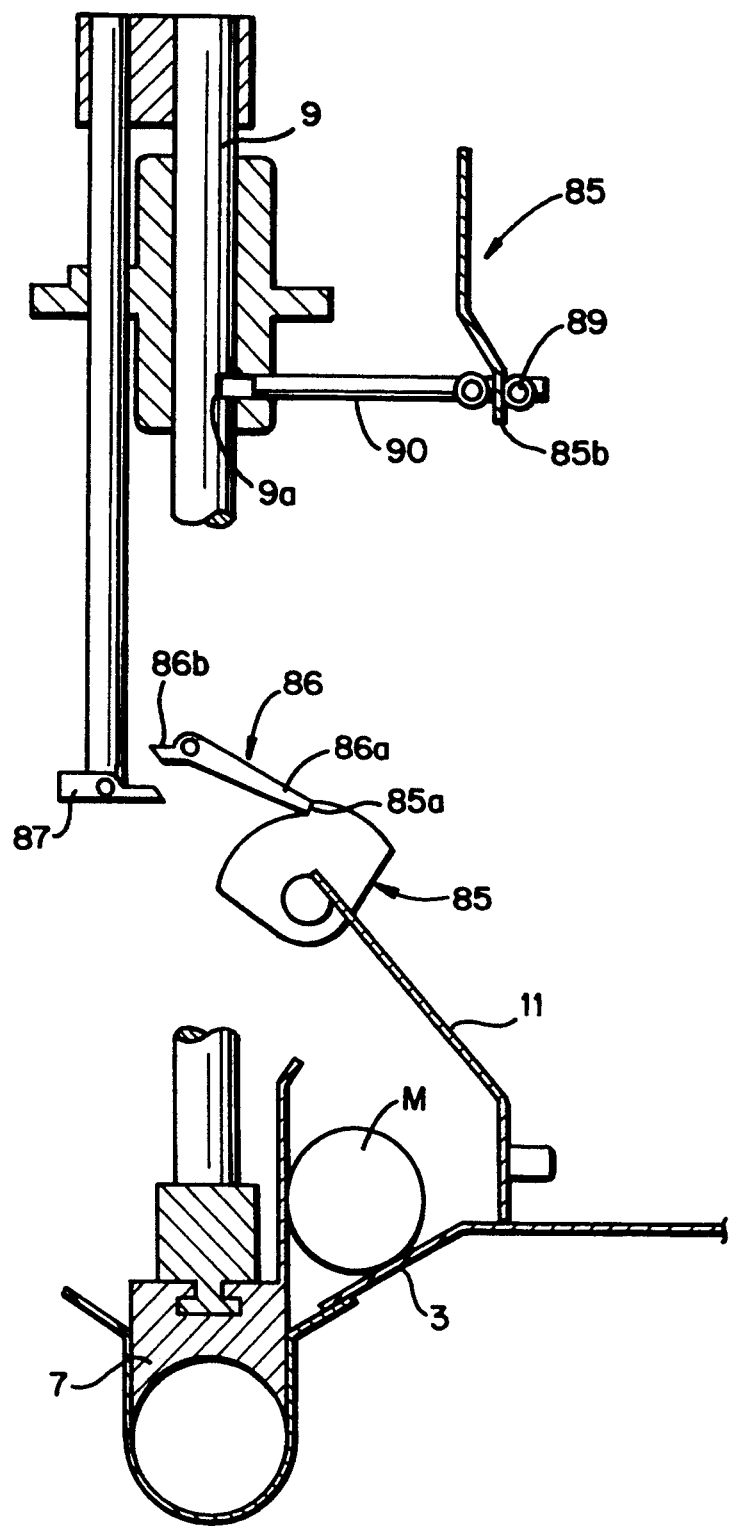

In this state, if the safety cover 11 is closed, as shown in FIG. 27, the cam ridge 85b of the plate cam 85 is brought into contact with the abutment roller 89 and moves the lock pin 90, thereby canceling the fitting of the lock pin 90 in the lock hole 9a. For this reason, the upper die 7 becomes upwardly movable, and starts its upward motion upon receiving a signal from an unillustrated sensor. In this state, the engaging pawl 86a of the lock member 86 is engaged with the engaging stepped portion 85a of the plate cam 85, so that the opening operation of the safety cover 11 is prevented.

Figure 28:
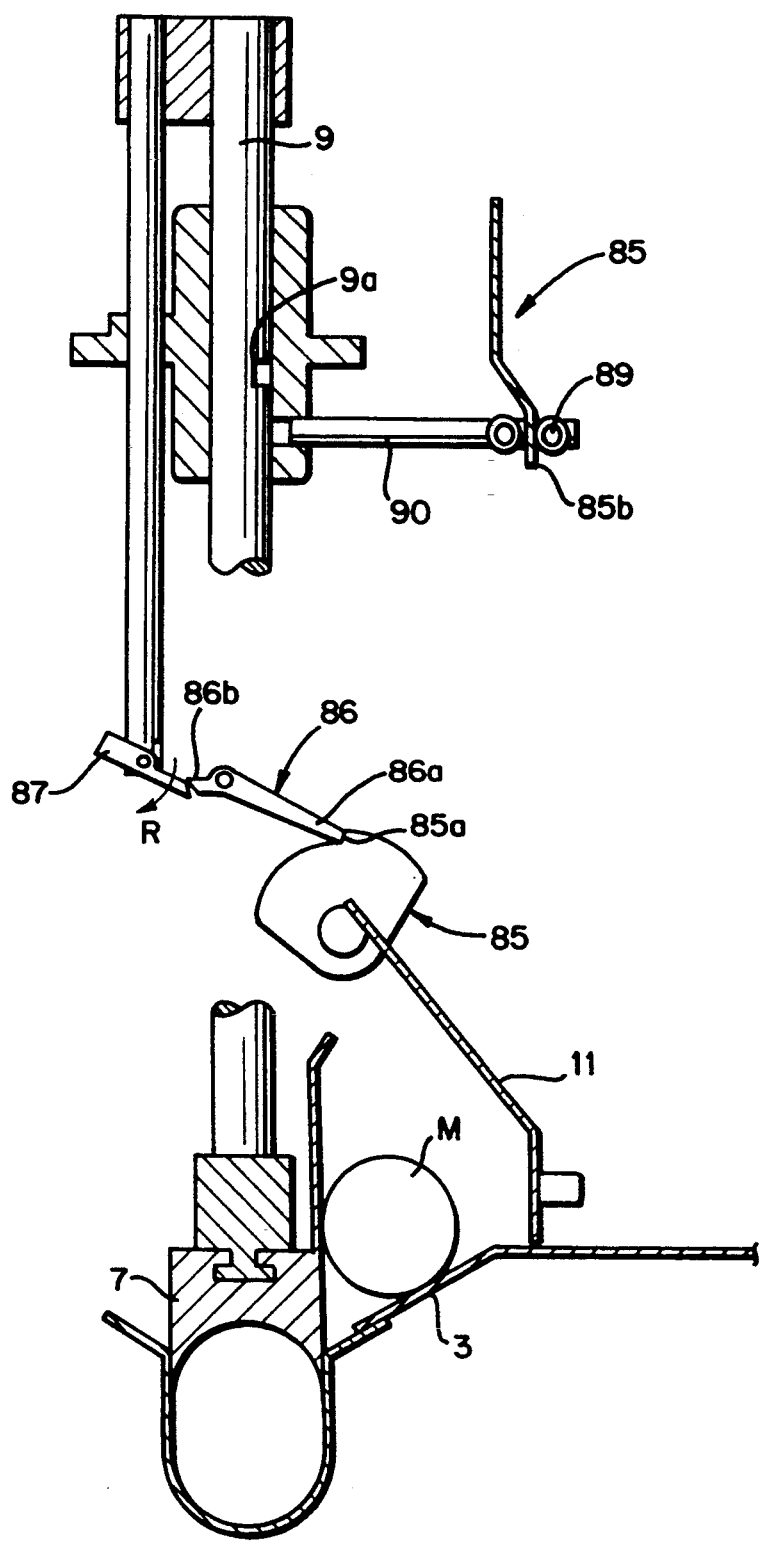

Then, as shown in FIG. 28, when the upper die 7 starts to rise, the lock canceling member 87 is brought into contact with the abutment portion 86b of the lock member 86; however, as the lock canceling member 87 rotates in the direction of R in the drawing, the engaging pawl 86a of the lock member 86 does not cancel its engagement with the engaging stepped portion 85a. The rotation of this lock canceling member 87 occurs only during the upward movement of the upper die 7, and does not occur during the downward movement of the upper die 7.

When the upper die 7 is further raised, as shown in FIG. 29, the meat mass M which has been stopped by the upper die 7 (or the stopper plate 7c provided on the upper die 7) is fed to the lower die 4.

Figure 30:
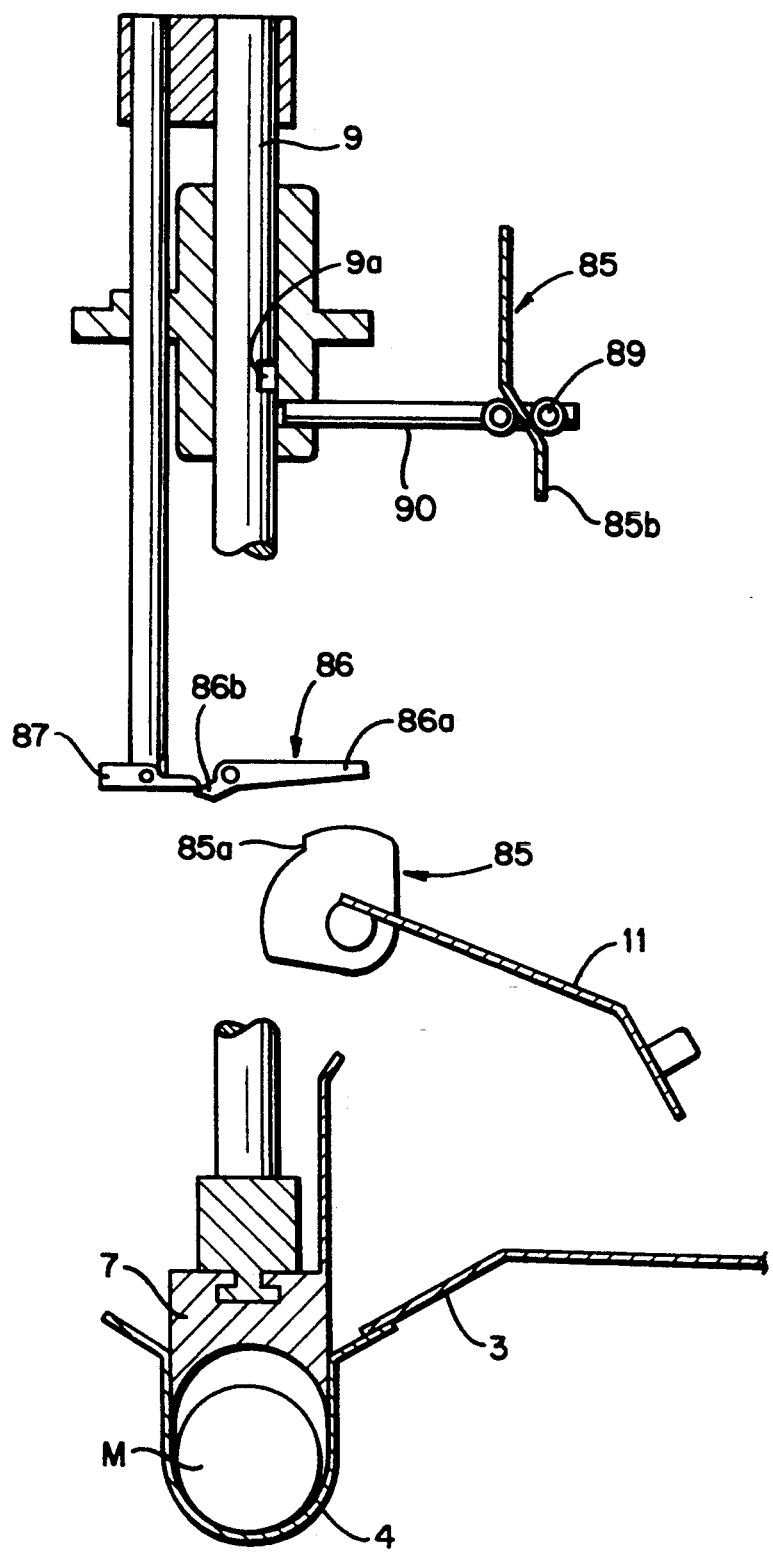

Subsequently, as shown in FIG. 30, when the upper die 7 is lowered and reaches a position in which the upper die 7 and the lower die 4 are fitted with each other, the lock canceling member 87 is brought into contact with the abutment portion 86b of the lock member 86, thereby canceling the engagement between the engaging pawl 86a and the engaging stepped portion 85a of the plate cam 85. For this reason, the safety cover 11 undergoes an opening operation by means of the spring 88. The lock pin 90 is moved toward the lock hole 9a in the guide rod 9 via the cam ridge 85b of the plate cam 85 rotating integrally with the opening operation of the safety cover 11, and via the abutment roller 89. Then, as the upper die 7 is further lowered and the lock hole 9a of the guide rod 9 reaches the position of the lock pin 90, the lock pin 90 is fitted into the lock hole 9a, as shown in FIG. 26. As a result, in the event that the upper die 7 tends to rise due to a misoperation of the operator in the state in which the safety cover 11 is open, the lock pin 90 prevents the upper die 7 from being raised.

In the foregoing description, when reference is made to the meat mass, the meat mass is not restricted to ham, and includes an emulsion product serving as a material for sausage.

In addition, in the description of the safety device, when reference is made to the fitting of the upper die and the lower die, it is not necessarily restricted to the arrangement in which the upper and lower dies are fitted together, but also refers to a state in which the upper and lower dies are brought into contact with each other, and to a state in which the upper and lower dies have approached each other and have approached up to a position in which the operator's fingers, hand, or the like are not nipped thereby.

The advantages of the manufacturing apparatus of the present invention arranged as described above are as follows.

First, since the upper die is fitted in the lower die during a steady state, and the meat mass is automatically fed into the lower die simultaneously as the upper die is raised, it is possible to speed up the manufacturing process, and no danger is presented in the meat-mass feeding operation.

In addition, since the safety cover is capable of undergoing an opening operation only when the upper die is in a state in which it is fitted in the lower die, the operator's fingers, hand, or the like are not nipped by the upper and the lower dies, and the safety in operation improves in this aspect as well.

In addition, since the structure provided is such that the meat juice and meat pieces, which are otherwise scattered around the apparatus during manufacture, are concentrated on one location of the apparatus, the meat juice and meat pieces are prevented from adhering to various parts of the apparatus, so that the apparatus can be kept clean and the working environment can be improved. Also, the need for cleaning and washing is reduced, and handing can be simplified.

In addition, in foodstuff machines, it is necessary to clean the overall apparatus after completion of the operation so as to be ready for an ensuing operation. With the apparatus of the present invention, the operations of mounting and demounting the upper die, the lower die, and the displacement body are simple, and these parts can be removed and cleaned, so that the cleaning operation does not require much time and trouble.

In addition, since the rod of the pusher disposed in the means for forcing in the meat mass is cleaned by the high-temperature liquid, the rod is prevented from becoming stained by the meat pieces and meat juice, thereby causing no hindrance to the operation.

In addition, there is no leakage of meat pieces and meat juice from the portion where the cutter is provided; the quantitative accuracy or yield improves, and the working environment becomes clean.

In addition, in a case where the remaining meat needs to be taken out separately, the remaining meat can be discharged simply by means of the changeover member, so that there is no suspension of operation in the meantime and the manufacturing process can be speeded up.

In addition, since the displacement body does not have a center shaft, as compared with the conventional arrangement, the outside diameter can be reduced by the portion in which the center shaft is not provided, thereby making it possible to attain a compact apparatus.

Furthermore, if the pushing member is provided on the inner side of the safety cover, even if the meat mass is in an adhesive state on the placing table, the meat mass can be forcibly fed into the lower die.

We claim:

1. An apparatus for manufacturing meat products comprising a displacement body having a metering port into which a meat mass is filled, a placing table for placing the meat mass thereon, a lower die into which a meat mass on said placing table is dropped, an upper die which is fitted to said lower die, means for forcing the meat mass formed by said upper die and said lower die into a metering port in said displacement body, means for displacing said displacement body from a predetermined position to another position, and means for extruding the meat mass in said metering port in said displacement body when displaced to said another position, wherein said apparatus is provided with an openable safety cover for covering said placing table and said lower die, said placing table forming an inclined surface between said safety cover and said lower die, said upper die fitted to said lower die having a stopper portion for preventing a downward movement of the meat mass arranged in advance of said inclined surface, and said upper die being moved upward with said safety cover closed, thereby to automatically feed the meet mass to an interior of said lower die.

2. An apparatus for manufacturing meat products, comprising a displacement body having a metering port into which a meat mass is filled, a placing table for placing the meat mass thereon, a lower die into which the meat mass on said placing table is dropped, an upper die which is fitted to said lower die, means for forcing the meat mass formed by said upper die and said lower die into said metering port in said displacement body, means for displacing said displacement body from a predetermined position to another position, and means for extruding the meat mass in said metering port in said displacement body when displaced to said another position, wherein said apparatus is provided with an openable safety cover for covering said placing table and said lower die, and a pushing member rotatably disposed on an inner side of said safety cover, said pushing member being rotated by the upward movement of said upper die when said upper die is moved upward with said safety cover closed, thereby to feed the meat mass to an interior of said lower die.

3. An apparatus for manufacturing meat products, comprising a displacement body having a metering port into which a meat mass is filled, a placing table for placing the meat mass thereon, a lower die into which the meat mass on said placing table is dropped, an upper die which is fitted to said lower die, means for forcing the meat mass formed by said upper die and said lower die into said metering port in said displacement body, means for displacing said displacement body from a predetermined position to another position, and means for extruding the meat mass in said metering port in said displacement body when displaced to said another position, wherein said apparatus is provided with an openable safety cover for covering said placing table and said lower die, first lock means for preventing an opening operation of said safety cover, second lock means for preventing an upward movement of said upper die, first controlling means for effecting control such that said second lock means is engaged when said safety cover undergoes the opening operation, and said second lock means is disengaged when said safety cover undergoes a closing operation, and second controlling means for effecting control such that said first lock means is disengaged at a position in which said upper die is fitted to said lower die, the engagement of said first lock means is effected by the closing operation of said safety cover, said safety cover becoming openable with said upper die fitted to said lower die, and the opening operation of said safety cover being not allowed in a state in which said upper die is undergoing the upward movement and a downward movement.

4. An apparatus for manufacturing meat products, comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, means for extruding the meat mass in said metering port in said displacement body when displaced to said another position, and a cutter disposed between said lower die and said metering port, said cuter being disposed vertically movably through a guide groove formed in an interior of two cases disposed with said cutter placed therebetween in a mutually sealed state.

5. An apparatus for manufacturing meat products, comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, means for extruding the meat mass in said metering port in said displacement body when displaced to said another position, and a cutter disposed between said lower die and said metering port, wherein said cutter is disposed vertically movably through a guide groove formed in an interior of two cases disposed with said cutter placed therebetween in a mutually sealed state, seal rings being provided between one of said two cases and a coupling cylindrical member disposed at an end of said lower die and between the other one thereof and said displacement body, respectively.

6. An apparatus for manufacturing meat products, comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, and means for extruding the meat mass in said metering port in said displacement body when displaced to said another position; and a liquid collecting plate disposed in an inclined manner underneath said lower die.

7. An apparatus for manufacturing meat products, comprising a displacement body having a metering port for receiving a meat mass, a lower die into which the meat mass is fed, an upper die fitted to said lower die, means for forcing the meat mass formed by said upper die and said lower die into said metering port in said displacement body, means for displacing said displacement body from a predetermined position to another position, means for extruding the meat mass in said metering port in said displacement body when displaced to said another portion, said upper die being slidably fitted in a holder for holding said upper die and said holder, and a member movable between a first position for releasably preventing relative sliding movement of said upper die and a second position enabling movement of said upper die relative to said holder to permit said upper die to become detached therefrom, said lower die having a cylindrical portion which is inserted into a hole for positioning said lower die and a fixing portion for detachably affixing said lower die to a base, said lower die being rendered detachable relative to said base in response to loosening said fixing portion to enable said cylindrical portion of said lower die to be withdrawn from said hole.

8. An apparatus for manufacturing meat products comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, and means for extruding the meat mass in said metering port in said displacement body when displaced to said another position, said means for forcing the meat mass into said metering port including a pusher which is reciprocated by a cylinder, and a rod of said pusher penetrating through a tank in which a high-temperature liquid is stored.

9. An apparatus for manufacturing meat products, comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, means for extruding through a discharge nozzle the meat mass in said metering port in said displacement body when displaced to said another position, a changeover member including a communicating pipe for introducing the meat mass in said metering port into said discharge nozzle and a discharge pipe for discharging the meat mass to a place other than said discharge nozzle, said changeover member being movable between said metering port positioned at a meat mass extruding position and said discharge nozzle.

10. An apparatus for manufacturing meat products, comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, and means for extruding the meat mass in said metering port in said displacement body when displaced to said another position, a frame member having a space for accommodating said displacement body in a such a manner as to surround an outer peripheral surface of said displacement body, and a bearing disposed between an inner surface of said frame member and said outer peripheral surface of said displacement body, said displacement body being supported rotatably on said frame member by said bearing for rotation relative to said frame member.

11. An apparatus for manufacturing meat products, comprising a placing table for placing a meat mass thereon, a lower die into which the meat mass on said placing table is dropped, an upper die which is fitted to said lower die, and means for extruding the meat mass formed by said upper die and said lower die, an openable safety cover for covering said placing table and said lower die, said placing table forming an inclined surface between said safety cover and said lower die, said upper die fitted to said lower die having a stopper portion for preventing the downward movement of the meat mass arranged in advance on said inclined surface, a discharge nozzle being provided at an end of said lower die, and said upper die being moved upward with said safety cover closed, thereby to automatically feed the meat mass to an interior of said lower die.

12. An apparatus for manufacturing meat products, comprising a placing table for placing a meat mass thereon, a lower die into which the meat mass on said placing table is dropped, an upper die which is fitted to said lower die, and means for extruding the meat mass formed by said upper die and said lower die, an openable safety cover for covering said placing table and said lower die, a pushing member rotatably disposed on an inner side of said safety cover, said pushing member being rotated by the upward movement of said upper die when said upper die is moved upward with said safety cover closed, thereby to feed the meat mass to an interior of said lower die, and a discharge nozzle is provided at an end of said lower die.

13. An apparatus for manufacturing meat products, comprising a placing table for placing a meat mass thereon, a lower die into which the meat mass on said placing table is dropped, an upper die fitted to said lower die, and means for extruding the meat mass formed by said upper die and said lower die, an openable safety cover for covering said placing table and said lower die, first lock means for preventing an opening operation of said safety cover, second lock means for preventing an upward movement of said upper die, first controlling means for effecting control such that said second lock means is engaged when said safety cover undergoes the opening operation, and said second lock means is disengaged when said safety cover undergoes a closing operation, second controlling means for effecting control such that said first lock means is disengaged at a position in which said upper die is fitted to said lower die, and a discharge nozzle at an end of said lower die, the engagement of said first lock means being effected by the closing operation of said safety cover, said safety cover becoming openable with said upper die fitted to said lower die, and the opening operation of said safety cover being not allowed in a state in which said upper die is undergoing the upward movement and a downward movement.

14. An apparatus for manufacturing meat products, according to claim 9, including stopper means for entering up to a predetermined position in said metering port to limit the meat mass entering said metering port, said stopper means being movable from said metering port to enable said displacement body to be displaced after the meat mass is formed into said metering port.

15. An apparatus for manufacturing meat products, comprising a placing table for placing a meat mass thereon, a lower die into which the meat mass on said placing table is dropped, an upper die which is fitted to said lower die, and means for extruding the meat mass formed by said upper die and said lower die, wherein a guide groove having notched ports is provided in said upper die, guides provided on parts on a holder are fitted in said guide groove, said lower die is affixed to a base by means of a tightening member, and said upper die and said lower die are demounted or mounted as a unit by loosening said tightening member.

16. An apparatus for manufacturing meat products, according to claim 7, including stopper means for entering up to a predetermined position in said metering port to limit the meat mass entering said metering port, said stopper means being movable from said metering port to enable said displacement body to be displaced after the meat mass is formed into said metering port.

17. An apparatus for manufacturing meat products according to claim 7 including pushers detachably disposed at distal ends of said forcing means and said extruding means, respectively;

a frame member having a space for accommodating said displacement body in such a manner as to surround an outer peripheral surface of said displacement body, and a bearing disposed between an inner surface of said frame member and said outer peripheral surface of said displacement body, said displacement body being supported rotatably on said frame member by said bearing for rotation relative to said frame member; and said displacement body being provided with a hole into which a cylindrical member for forming said metering port is releasably inserted, so as to render said cylindrical member for forming said metering port detachable.

18. An apparatus for manufacturing meat products comprising a displacement body having a metering port into which a meat mass is filled, a lower die into which the meat mass is fed, an upper die which is fitted to said lower die, means for forcing the meat mass formed by said upper die and said lower die into said metering port in said displacement body, means for displacing said displacement body from a predetermined position to another position, an means for extruding the meat mass in said metering port in said displacement body when displaced to said another position, a frame member having a space for accommodating said displacement body in such a manner as to surround a peripheral surface of said displacement body, and a bearing disposed between a surface of said frame member and said peripheral surface of said displacement body, said displacement body being supported rotatably on said frame member by said bearing for rotation relative to said frame member.

* * * * *

UNITED STATES PATENT AND TRADEMARK OFFICE
CERTIFICATE OF CORRECTION

PATENT NO. : 5,364,302
DATED : November 15, 1994
INVENTOR(S) : Chiyoji Shibata; Minoru Nakamura It is certified that error appears in the above-identified patent and that said letters patent is hereby corrected as shown below:

Column 3, line 45, after "cut" insert --,--.

Column 5, line 19, delete "to" (first occurrence).

Column 10, line 36, in the heading, change "OR" to --FOR--.

Column 12, line 39, delete "30".

Column 14, line 56, delete "carl" and insert --can--.

Column 19, line 33, delete "Rushing" and insert --pushing--; line 63, delete "surfacer" and insert --surface,--.

Column 21, line 55, delete "handing" and insert --handling--.

Column 22, line 39, delete "of" and insert --on--; line 41, delete "meet" and insert --meat--.

Column 23, line 20, delete "is" and insert --being--;

Column 24, line 2, delete "and"; line 4, delete ";" and insert --,--; line 18, delete "and said"; line 19, delete "holder"; line 54, before "means" insert --and--.

Column 25, line 8, delete "a"; line 19, delete "and"; line 20, after "die," insert --and--; line 35, delete "and"; line 38, after "die," insert --and--; line 43, delete "is" and insert --being--; line 49, delete "and".

UNITED STATES PATENT AND TRADEMARK OFFICE
CERTIFICATE OF CORRECTION

PATENT NO. : 5,364,302

DATED : November 15, 1994

INVENTOR(S) : Chiyoji Shibata; Minoru Nakamura

It is certified that error appears in the above-indentified patent and that said Letters Patent is hereby corrected as shown below:

Column 26, line 9, delete "formed" and insert —forced—; line 28, delete "formed" and insert —forced—.

Signed and Sealed this

Sixteenth Day of May, 1995

Attest:

BRUCE LEHMAN

Attesting Officer

Commissioner of Patents and Trademarks